United States Patent
Smith et al.

(10) Patent No.: US 10,600,024 B2
(45) Date of Patent: Mar. 24, 2020

(54) AUTOMATED SMART PEG SYSTEM MONITORING ITEMS

(71) Applicant: Walmart Apollo, LLC, Bentonville, AR (US)

(72) Inventors: Shaun M. Smith, Gravette, AR (US); William Ross Allen, Pea Ridge, AR (US); Richard M. Blair, II, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 277 days.

(21) Appl. No.: 15/906,629

(22) Filed: Feb. 27, 2018

(65) Prior Publication Data

US 2018/0336513 A1 Nov. 22, 2018

Related U.S. Application Data

(60) Provisional application No. 62/507,155, filed on May 16, 2017.

(51) Int. Cl.
*G06Q 10/08* (2012.01)
*G05B 19/406* (2006.01)

(52) U.S. Cl.
CPC ......... *G06Q 10/087* (2013.01); *G05B 19/406* (2013.01)

(58) Field of Classification Search
CPC combination set(s) only.
See application file for complete search history.

(56) References Cited

U.S. PATENT DOCUMENTS

| | | | |
|---|---|---|---|
| 8,260,456 B2 | 9/2012 | Siegel et al. | |
| 9,275,361 B2 | 3/2016 | Meyer | |
| 10,037,449 B1* | 7/2018 | Hahn | G06K 7/0008 |
| 10,089,505 B1* | 10/2018 | Huebner | H01Q 1/2216 |
| 2016/0004995 A1* | 1/2016 | Meehan | H04W 4/80 |
| | | | 705/26.9 |
| 2016/0071052 A1* | 3/2016 | Henry | G06Q 10/087 |
| | | | 235/380 |
| 2016/0086460 A1* | 3/2016 | King | G08B 13/1436 |
| | | | 340/572.1 |
| 2016/0134930 A1 | 5/2016 | Swafford | |

(Continued)

OTHER PUBLICATIONS

Swedberg, Claire, "Panasonic Adds Bluetooth Beacons to Electronic Shelf Labels", RFID Journal, Feb. 4, 2015, pp. 1-2.

(Continued)

*Primary Examiner* — Travis R Hunnings

(57) ABSTRACT

A system and method is provided for autonomous monitoring of items by smart peg devices. On occurrence of a predetermined event, a smart peg device analyzes sensor data received from a set of sensors associated with a set of items. The set of sensors includes a weight sensor and/or a proximity sensor. The smart peg device determines a status of the smart peg device based on the analyzed sensor data and a set of criteria. The status may include a number of items associated with the given peg, a weight of the item(s), and/or a location of item(s) associated with the given peg. The smart peg controller determines whether to send a notification based on the status. If a notification is needed, the smart peg device outputs the notification to a remote computing device. The notification may include the determined status and/or a recommended corrective action.

20 Claims, 12 Drawing Sheets

(56) References Cited

U.S. PATENT DOCUMENTS

| | | |
|---|---|---|
| 2016/0260054 A1 | 9/2016 | High et al. |
| 2017/0053505 A1* | 2/2017 | Lauria ................. G06Q 10/087 |
| 2017/0109555 A1* | 4/2017 | Koch ................... G01S 13/751 |
| 2018/0173807 A1* | 6/2018 | Prakash ............... H04W 76/10 |
| 2019/0108373 A1* | 4/2019 | Ito ......................... H04W 4/80 |

OTHER PUBLICATIONS

Unknown, "Meet peggy, the world's smartest clothes peg", OMO, http://www.omo.com/au/dirt-is-good/real-play/peggy.html, captured Jan. 19, 2017, pp. 1-4.

* cited by examiner

AUTOMATED SMART PEG SYSTEM MONITORING ITEMS

BACKGROUND

Retail stores frequently display products on pegs for easy accessibility by customers. A peg may be attached to a wall, a shelf, a stand, or any other surface. Typically, one or more items are hung from the peg. The item hanging in the front of the peg is most visible while items hanging on the back portion of the peg are less visible to customers. A peg sometimes includes a label or other signage indicating the name or type of items hanging on the peg and/or a price. Customers frequently remove an item from a peg and then re-hang the item on the wrong peg. This may result in a peg having too many items hanging on it. This also results in items hanging on a peg associated with a label or other signage which does not correspond to the items hanging on the peg.

In addition, when all the items on a peg have been removed by customers, a store associated typically restocks the peg with additional items. However, store associates are required to manually inspect each peg to determine if a peg requires restocking. This is a time consuming and inefficient process which may result in pegs remaining empty for extended periods of time. These empty pegs may result in customer inconvenience and lost sales.

SUMMARY

Examples of the disclosure provide a system for autonomously monitoring items associated with a peg display. A smart peg device is implemented on the peg display. At least one item is assigned to the smart peg device. A set of sensors is configured to detect at least one item associated with the smart peg device. A smart peg controller is implemented on at least one processor. The smart peg controller is communicatively coupled to the set of sensors. The smart peg controller activates the set of sensors on occurrence of a per-peg beacon interval. The smart peg controller obtains sensor data generated by the set of sensors. The smart peg controller analyzes the obtained sensor data to determine a status of the smart peg device. The smart peg controller determines whether sending a notification is authorized based on the determined status and a set of criteria. In response to a determination that sending the notification is authorized, the smart peg controller generates the notification. The smart peg controller activates a beacon device to output the generated notification to at least one remote computing device. The smart peg controller returns to a stand-by mode until a next occurrence of the per-peg beacon interval.

Other examples provide a method for autonomously monitoring items associated with a peg display. A per-peg beacon interval and a set of beacon criteria are extracted from calibration data associated with a smart peg device. In response to an expiration of the per-peg beacon interval, sensor data is obtained from a set of sensors associated with a smart peg device for displaying a set of items. The sensor data includes weight data for a set of items on the smart peg display. The obtained sensor data, including the weight data, is analyzed using a predetermined weight of the assigned item. A status of the smart peg device is determined using the analysis results and the set of beacon criteria. The status comprising a number of items in the set of items or an indication of at least one misplaced item in the set of items. A determination is made as to whether to send a beacon notification based on the determined status of the smart peg device. In response to determining a beacon notification is authorized, the beacon notification is transmitted to at least one remote computing device. In response to determining the beacon notification is unauthorized, the smart peg device is switched into a stand-by mode.

Still other examples provide one or more computer storage devices storing computer-executable instructions for monitoring items associated with a peg display. The computer executes the computer-executable instructions to switch a smart peg controller from a stand-by mode to an active mode in response to an occurrence of a per-peg beacon interval to obtain sensor data from the one or more sensors. The sensors are communicatively coupled to the smart peg display. The sensor data used to detect removal or addition of an item relative to the smart peg display. The smart peg display includes at least one smart peg device. The sensor data is analyzed to detect at least one beacon criteria indicating a change in status of at least one item associated with the smart peg display. A determination is made as to whether transmission of the notification is authorized based on the analyzed sensor data and the at least one beacon criteria. A notification is generated in response to determining sending the notification is authorized. The notification is sent to at least one remote computing device via a network. The notification includes a peg identifier (ID) of a smart peg device and a recommended corrective action associated with the smart peg device. The smart peg controller is switched from the active mode to the stand-by mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
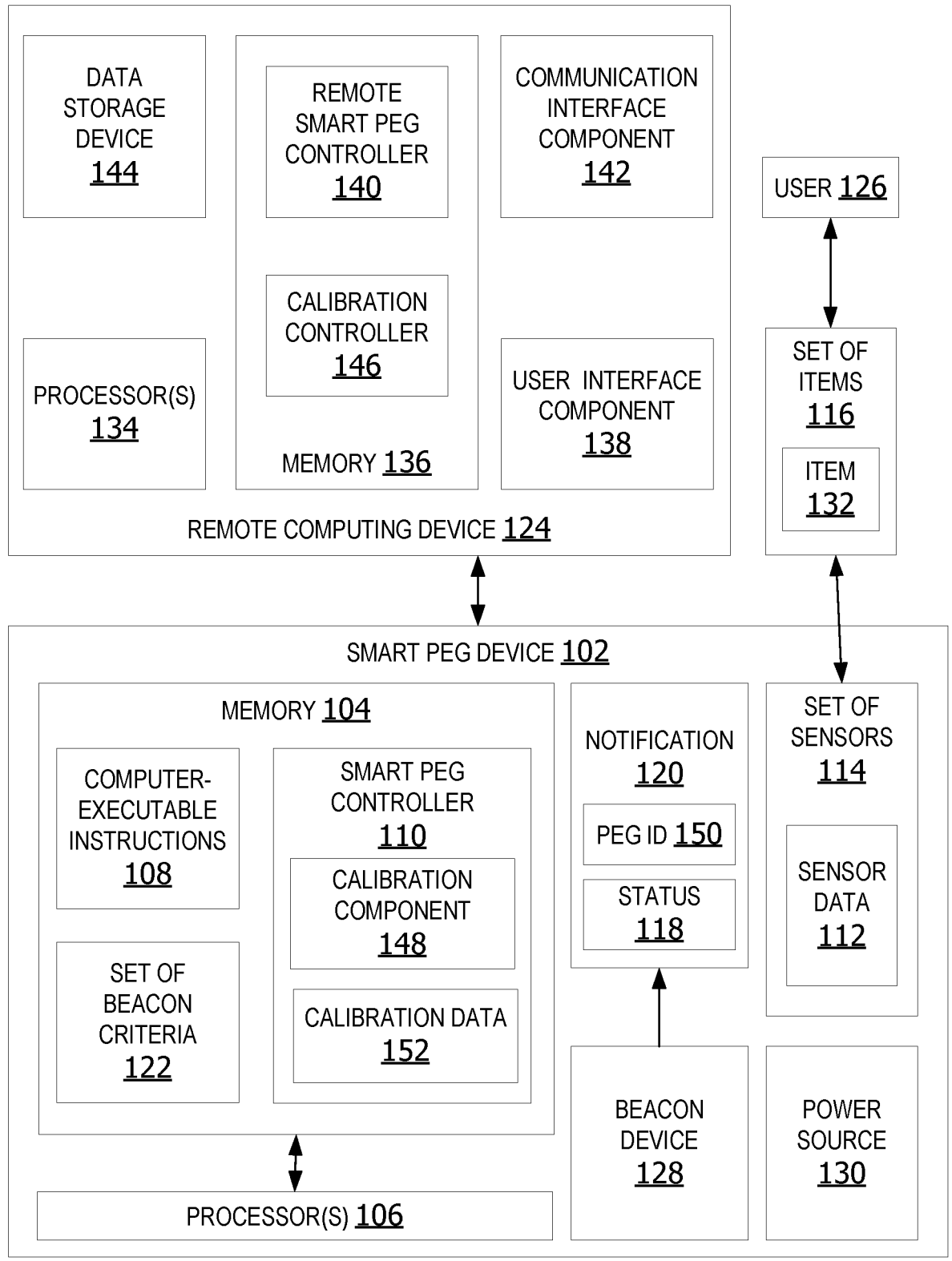
FIG. 1 is an exemplary block diagram illustrating a smart peg system for monitoring items associated with a smart peg device.

Referring to the figures, examples of the disclosure enable a smart peg display system. In some examples, a smart peg device includes a smart peg controller. The smart peg controller analyzes sensor data obtained from a set of sensors to determine when a status of the smart peg device changes. A status change may occur upon events such as items removed from a peg, items added to the peg, an empty peg, an incorrect item added to the peg, a malfunctioning peg, or other changes in the state of the peg, for example. In this manner, the smart peg device performs autonomous status checks without human intervention. This provides increased inventory management efficiency and reduces user error.

The set of sensors in some examples includes a weight sensor. The weight sensor detects a change in weight associated with items hanging on the peg. When the weight sensor detects a change in weight associated with items hanging on the peg, the weight sensor sends sensor data indicating the weight change to a smart peg controller. The weight change may indicate an item being removed from the peg, an item being placed on the peg, or an empty peg. In this manner, the smart peg controller detects state changes, such as items being removed or added to the peg, incorrect items being added to the peg, too many items on the peg, and/or an empty peg, autonomously and automatically, without intervention by a human user.

A smart peg device in other examples includes a radio frequency identification (RFID) tag reader in the set of sensors. The RFID tag reader obtains item data from an RFID tag on each item in a set of items on the smart peg device. The item data retrieved from RFID tags enables the smart peg device to identify items on a peg, identify a location of each item on a peg, identify misplaced items with improved granularity and vertical accuracy. In other words, the RFID tag read on the smart peg device enables improved accuracy in locating a more precise and granular location of items correctly placed on the peg and incorrect items that have been misplaced on the peg.

In other examples, the set of criteria indicates a threshold weight associated with an item and/or a peg. If a weight of an item placed on the peg exceeds the threshold weight or is less than a threshold weight, the smart peg controller identifies a potentially misplaced item on the peg. If the weight of a peg exceeds a peg weight threshold or falls below a minimum weight threshold the smart peg controller uses the weight data to determine the peg is overstocked or understocked. This improves inventory maintenance of each peg and reduces the number of improperly stocked pegs.

The set of sensors in other examples includes one or more proximity sensors. A proximity sensor detects changes in light associated with a peg. The light changes may indicate a presence of a user relative to the peg, such as a user reaching for an item on the peg, removing an item from a peg, or adding an item to a peg, for example. The proximity sensor data is utilized by a smart peg controller to determine a state of a peg and/or items on the peg without intervention by a human user. This enables more efficient and accurate maintenance of items associated with peg displays.

In other examples, the smart peg controller analyzes the sensor data using a set of criteria for sending a notification. The criteria indicate when a notification should be sent or when a status change should be disregarded. If the set of criteria indicate the peg is empty, requires restocking, incorrect items are hanging on the peg, items on the peg are improperly placed on the peg, or user action is otherwise required, the peg controller generates a notification and sends it to a user device or other computing device to notify a user. The notification informs the user of the peg status and/or recommended action. The notification alerts users to restock or readjust items associated with a peg display. This notification improves efficiency of human users restocking pegs. It further increases the availability and sales of items associated with the peg display.

The notification may be sent via a beacon to a user device. The beacon may be implemented as a light signal, BLUETOOTH transmission, or other notification signal transmitted to the user device in an absence of a network. This reduces network bandwidth usage.

In yet other examples, the sensor data is transmitted to a remote computing device by the smart peg controller associated with a peg display. A remote smart peg controller on the remote computing device analyzes the sensor data, determines if a notification should be sent and/or corrective action is necessary, and sends the appropriate notifications to one or more user devices and/or other remote computing devices. This reduces memory usage, processor usage, data storage usage, and/or power requirements by the smart peg device.

The recommended action in some examples includes restocking items, rearranging/reorienting items, removing items, and/or otherwise taking a corrective action to the peg. This autonomous notification transmission reduces empty or improperly stocked pegs and improves availability of items associated with pegs. This further improves customer efficiency in locating desired items, improves maintenance of peg displays, and reduces lost sales due to empty pegs and/or properly stocked pegs.

Referring again to FIG. 1, an exemplary block diagram is provided illustrating a smart peg system for monitoring items associated with a smart peg device. The smart peg display system 100 represents a system for monitoring one or more items associated with one or more pegs. A peg is a device for hanging, holding, fastening, or otherwise displaying one or more items. A peg may be implemented as a rod, cylinder, hook, or other hanger capable of hanging, holding, or fastening one or more items. A peg may include a bracket, rod, or other attachment for securing the peg to a wall, shelf, or other peg display. A peg may be implemented as a wooden peg, a plastic peg, a metal peg, a peg composed of a composite material, or any other appropriate material.

The smart peg system includes one or more smart peg devices, such as smart peg device 102. The smart peg device 102 is a peg including a memory 104 and one or more processor(s) 106. The one or more processor(s) 106 include any quantity of processing units programmed to execute computer-executable instructions 108 for monitoring items associated with the smart peg display system 100. The computer-implemented instructions 108 may be performed by the one or more processor(s) 106 within the smart peg device 102, or performed by one or more processors external to the smart peg device 102. In some examples, the processor(s) are programmed to execute instructions such as those illustrated in the figures (e.g., FIG. 8 and FIG. 9).

In some examples, the processor(s) 106 represent an implementation of analog techniques to perform the operations described herein. For example, the operations may be performed by an analog computing device and/or a digital computing device.

Figure 2:
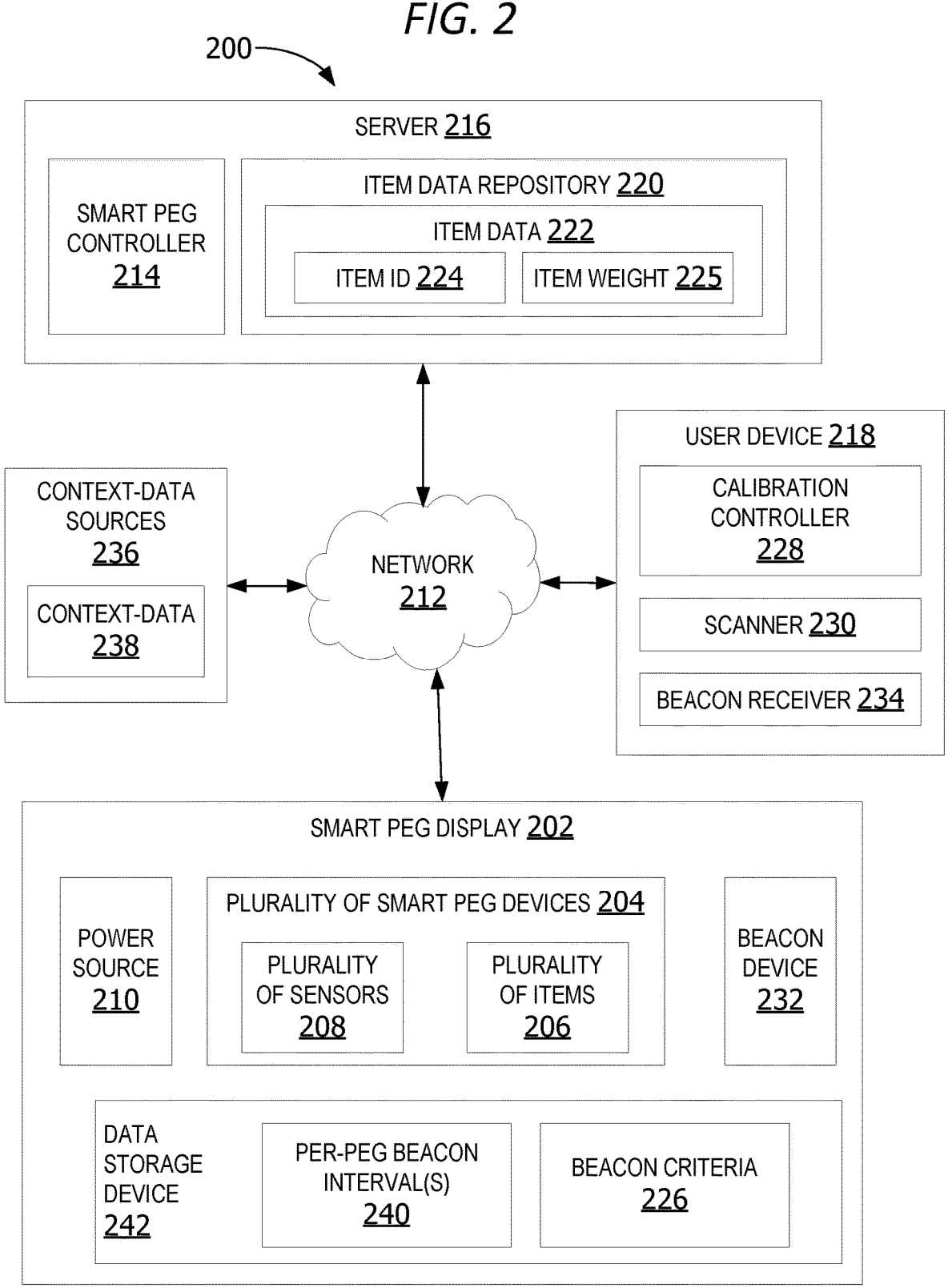
FIG. 2 is an exemplary block diagram illustrating a smart peg display system including a network for calibrating smart peg device and generating beacon notifications.

The memory 104, in some examples, includes any quantity of media associated with or accessible by the smart peg device 102. The memory 104 may be internal to the smart peg device 102 (as shown in FIG. 1), external to the smart peg device (as shown in FIG. 2), or both (not shown). In some examples, the memory area includes read-only memory and/or memory wired into an analog computing device.

The memory 104 stores data, such as the smart peg controller 110. The smart peg controller 110 is a software component which, when executed by the processor, operates to perform functionality on the smart peg device 102. The smart peg controller 110 optionally communicates with other applications or services, such as web services accessible via a network (not shown). For example, the applications may represent downloaded client-side applications that correspond to server-side services executing in a cloud.

The memory stores the smart peg controller 110, the calibration component 148, as well as any other computer-executable instructions 108 for performing the functionality of the smart peg device. In other examples, the memory 104 also stores the sensor data 112.

During a calibration phase, the calibration component 148, when executed by the processor(s) 106, causes the processor(s) 106 to obtain calibration data from the remote computing device 124. The calibration data 152 may include item data, such as, but not limited to, a per-peg beacon interval for a particular item, beacon criteria, a predetermined weight of one or more items, or other item data.

The calibration component 148, in some examples, extracts the per-peg beacon interval, the set of beacon criteria 122, and/or any other available item data from the calibration data 152. In this example, the calibration data 152 is transmitted to the smart peg device by calibration device, such as the remote computing device 124.

The calibration device includes a calibration controller 146 for analyzing item data and/or context data to generate calibration data 152 to calibration the smart peg device 102 for a given assigned item 132. The smart peg device 102 is calibrating using different calibration data to calibrate the smart peg device 102 for each unique type of item assigned to be displayed on the smart peg device 102. For example, if an assigned item for a calibrated smart peg device is changed from socks to gloves, the smart peg device is recalibrated using new calibration data generated using item data for the newly assigned gloves. In this manner, the calibration of the smart peg device is tailored to the particular item assigned to be displayed on the peg.

For example, the per-peg beacon interval specified for the socks may be changed to a longer or shorter interval for the gloves. Likewise, the thresholds in the beacon criteria for the socks may include different maximum and/or minimum threshold values for the gloves. The smart peg device 102 in this example is recalibrated using new calibration data when the peg is restocked with gloves.

The calibration controller 146 in other examples obtains the item data from an item data repository (shown in FIG. 2 below). The item data repository may be located on a remote data storage device, a local data storage, a server, or received from a user device.

In other examples, the calibration data 152 may be provided in whole or in part via user input provided to the calibrating device via a user interface, such as the user interface component 138 of remote computing device 124. In these examples, the user 126 utilizes the user interface component 138 on the remote computing device 124 to select or select one or more criteria in the set of beacon criteria 122 and/or select one or more predetermined events for triggering activation of the smart peg device 102.

The calibrating device transmits the calibration data 152 to the smart peg device. A calibration component 148 of the smart peg device extracts the beacon criteria and/or one or more predetermined events from the calibration data 152. In other examples, the calibration component 148 generates the set of beacon criteria and/or at least one predetermined event using item data. The item data includes an item weight, item identifier, and other information associated with a given item assigned to the smart peg device.

The smart peg controller 110, when executed by the processor(s) 106, causes the processor(s) 106 to activate the smart peg device 102 in response to a predetermined event. The predetermined event is an event triggering activation of the smart peg device to collect sensor data and analyze the sensor data to determine a status of the smart peg device and/or the status of one or more items associated with the smart peg device.

The predetermined event in some example is an occurrence of a per-peg beacon interval. The per-peg beacon interval is a predetermined period of time during which the smart peg device remains in stand-by (power-off or low-power) mode. The per-peg beacon interval may be a user selected interval or an interval automatically generated by the calibration controller based on the item data, historical demand for the item, context-data associated with a location, and/or other data associated with current and predicted turnover rates of the item 132.

In some examples, the calibration component 148 on the smart peg device retrieves the per-peg beacon interval from the calibration data. In other examples, the calibration component 148 generates the per-peg beacon interval for the smart peg device based on an analysis of the item data. In other examples, the smart peg device calculates a per-peg beacon interval based on the item data and/or context-data received from one or more sources of context-data.

At an occurrence of the beacon interval, the smart peg device activates/switches from stand-by mode to active mode. During the stand-by mode, the smart peg controller 110 does not obtain sensor data, analyze sensor data, or initiate beacon transmissions. During stand-by mode the sensors, beacon-device, and smart peg device are in an inactive state. During an active state, the smart peg controller obtains sensor data from sensors, analyzes the sensor data, and sends notifications to one or more user device(s) via the beacon device.

For example, if the per-peg beacon interval is twenty-four hours, the smart peg device remains in stand-by mode for twenty-four hours. At the end of the twenty-four hourtime period, the smart peg device 102 activates, obtains sensor data 112, and analyzes the sensor data using the set of beacon criteria 122 to determine a current status of the smart peg device and/or the set of items 116.

The set of items 116 is the set of items displayed on the smart peg device 102. The set of items 116 in this example includes the items hanging on a peg portion of the smart peg device 102. The set of items 116 may be a null set. In other words, the peg portion of the smart peg device 102 may be empty, it may contain a single item, or it may include two or more items hanging on the peg portion of the smart peg device.

The item 132 is an item assigned to the given smart peg device 102. The item 132 may include any type of goods or other products displayed on a peg. The item 132 may be hanging from the peg, hooked on the peg, or otherwise displayed on the smart peg device. For example, the item 132 may include a food item, a toy, an item of clothing, an electronic item, a video game, a cosmetic, a cleaning product, or any other type of item. Although the set of items 116 in FIG. 1 includes item 132, in other examples, the set of items 116 may be a null set including no items.

The predetermined event, in other examples, includes sensor data indicating the set of items displayed on the peg portion of the smart peg device is an empty set. In other words, sensor data indicating the weight of the set of items 116 falls below a minimum weight threshold or data otherwise indicating the smart peg device 102 is empty constitutes a predetermined event. The empty state of the smart peg device 102 triggers the smart peg device 102 to automatically switch from a stand-by mode to an active mode. This re-activation occurs due to the empty status of the peg regardless of the per-peg beacon interval.

The predetermined event in other examples may include sensor data indicating the weight of the smart peg device and/or the weight of the set of items 116 exceeds a maximum weight threshold of the smart peg device 102. In other words, if the set of items 116 is too heavy, this indicates the smart peg device is overstocked and/or one or more incorrect items are hanging on the peg. The excess weight/overstock state of the smart peg device 102 triggers the smart peg device 102 to automatically switch from a stand-by mode to an active mode. This re-activation in this example occurs regardless of the per-peg beacon interval.

In other examples, a predetermined event includes a given data and/or time, receiving an activation signal from the remote computing device 124, manual user-activation, and/or a malfunction in the smart peg device 102 or the set of sensors 114. For example, the predetermined event may be the occurrence of twelve o'clock in the afternoon every day.

On activation, the smart peg controller 110 is further executed by the processor(s) 106 to obtain the sensor data 112 from the set of sensors 114. The smart peg controller 110 analyzes the obtained sensor data 112 using the set of beacon criteria 122 to determine whether a change in status 118 of the smart peg device 102 has occurred.

The set of beacon criteria 122 includes one or more criteria for determining a status of the smart peg device 102 and/or determining whether a given status change triggers sending of a notification 120. The criteria may include a threshold maximum number of items on the smart peg device 102, a threshold minimum number of items on the smart peg device 102, a threshold maximum weight of items on the smart peg device 102, a threshold minimum weight of items on the smart peg device 102 on the smart peg device 102, a known weight of an item associated with the peg, and/or any other criteria for determining status of a peg and/or a threshold for sending the notification 120.

In some examples, the set of beacon criteria 122 is updated to reflect current or predicted future changes in demand/turnover for one or more items assigned to the smart peg device, and/or smart peg device status trends. For example, the beacon criteria may indicate a beacon should be sent if the number of items is two items or the total weight on the peg is less than four ounces for an assigned item weighing two ounces. However, if demand for the item assigned to the smart peg device 102 increases or decreases, the set of beacon criteria 122 may be updated to reflect the actual changed item turnover or an expected/anticipated future change in item turn-over. In this example, the beacon criteria may be updated to increase the minimum number of items to five and a minimum weight of ten ounces for more frequent restocking/checking status of the peg inventory for high demand items.

The status 118 indicates a current state of the smart peg device 102 and/or the set of items on the smart peg device. The status 118 may include the current number of items 116 on the smart peg device and/or an operational status of the smart peg device. The smart peg controller 110 utilizes the results of the analysis and the set of beacon criteria 122 to determine whether a beacon notification 120 should be sent to the remote computing device 124.

The analysis may include, for example, using a predetermined weight of the item 132 assigned to display on the smart peg device with the weight data generated by a weight sensor to determine a number of items in the set of items 116 currently hanging on the peg portion of the smart peg device 102.

The sensor data 112 in other examples includes light data and/or proximity data indicating movements and changes in light exposure corresponding to one or more items being removed from the smart peg device. The sensor data 112 is utilized to determine a number of items added to the smart peg device and/or removed from the smart peg device.

If the number of items in the set of items hanging on the peg portion exceeds a threshold number of items, the beacon notification 120 is sent. Likewise, if the weight of the set of items 116 exceeds a maximum weight, the beacon notification 120 is sent.

In other examples, the analysis of the sensor data 112 includes using the threshold minimum weight or threshold minimum number of items with the current weight for the set of items 116 to determine whether the smart peg device is understocked or empty. If the number of items falls below the threshold minimum number of items or the weight of the set of items 116 falls below the minimum threshold weight, the notification 120 is transmitted by the beacon device 128 to the remote computing device 124.

The notification 120 in some examples may include a peg identifier (ID) 150. The peg ID 150 is a unique identifier or address identifying a given smart peg device. Every smart peg device may include a unique peg ID. The remote computing device 124 or other client device receiving the output notification identifies the smart peg device 102 that generated the notification based on the peg ID 150.

In other examples, the beacon notification includes a status 118 of the smart peg device 102. The status 118 may also include a recommended action to be taken by a user 126 associated with the remote computing device 124 receiving the notification 120. The user 126 may include human associate or other store personnel in some examples. In other examples, the user 126 may include an autonomous or robotic machine.

The smart peg device 102 deactivates without sending the notification 120 if there is no change in status of the smart peg device 102 or the criteria in the set of beacon criteria 122 for sending the notification are not met.

The criteria for sending the notification may be user-defined criteria and/or default criteria. When the criteria for sending the notification 120 is met, the notification 120 is sent to a remote computing device and/or output to a user.

In other examples, the smart peg device 102 deactivates following output of the notification to the user and/or one or more remote computing devices. In this example, the smart peg device 102 reactivates following occurrence of a next predetermined event.

The set of sensors 114 is a set of one or more sensors. The set of sensors in this example are integrated within the smart peg device 102. However, in other examples, the set of sensors 114 includes one or more sensors located externally to the smart peg device and communicatively coupled to the smart peg device. The remote sensors transmit their generated sensor data to the smart peg controller 110 via a beacon or other data transmission device.

A sensor in the set of sensors 114 may include, without limitation, a proximity sensor, a weight sensor, a motion detector, a RFID sensor, a temperature sensor, and/or a pressure sensor.

The notification 120 may be referred to as a beacon notification. The notification 120 is a notification including sensor data, a status of at least one peg, and/or a recommended corrective action. The notification may include only a status of a peg, only a recommended corrective action, only sensor data, and/or any combination of sensor data, a status, and a recommended corrective action. For example, the notification 120 may include a status and sensor data. The notification 120 in other examples includes a status and a recommended corrective action. In still other examples, the notification 120 includes a status, a recommended corrective action, and sensor data.

In some examples, the notification 120 is transmitted to the remote computing device 124 by a beacon device 128. The beacon device 128 is a device configured to transmit the notification 120 to one or more remote computing devices. The beacon device 128 may be implemented as a communications interface component capable of transmitting data via a network connection, a BLUETOOTH device, a near-field communications (NFC) device, a radio signal transmitter, or other device capable of transmitting data to the remote computing device 124. The beacon device 128 in some non-limiting examples may include a BLUETOOTH low energy (BLE) device. In still other examples, the beacon device 128 includes one or more lights, such as, but without limitation, one or more light emitting diodes (LEDs).

In some examples, the beacon device 128 does not transmit a constant stream of data. Instead, the beacon device 128 pings other computing devices at a certain cadence, regular intervals, or as triggered. For example, the beacon device 128 may only be activated at a pre-defined interval to save energy/decrease power consumption. This extends the life of any batteries utilized for the power source and improves overall energy efficiency. In other events, the beacon device 128 may be activated by a user or other trigger, such as receiving sensor data from the set of sensors.

The notification 120, in some examples, is output to the remote computing device 124 for output to the user 126 via the user interface component 138. In other examples, the notification 120 is output directly to the user 126. For example, the beacon device 128 activates one or more lights to output the notification directly to the user. The one or more lights may be flashing lights or steady lights to capture the attention of the user 126 to the smart peg device 102 and request corrective action.

The smart peg device may also output a notification directly to a user via one or more speakers communicatively coupled to the smart peg device. For example, a smart peg device may generate a sound via the one or more speakers to capture the attention of the user 126 to the smart peg device 102 and request corrective action. The sound may include a beep, whistle, or other audio output indicating corrective action is required.

In some examples, when a motion sensor, proximity sensor, or other sensor data indicates a user is in proximity to the smart peg device, the smart peg device may activate a light or speaker to generate output intended to capture the attention of the user 126. For example, the speaker(s) may generate a beeping noise and/or a flashing red light indicating corrective action should be taken about the smart peg device when the user 126 is in range of the smart peg device 102.

In other examples, the notification is output to the remote computing device 124. The remote computing device 124 outputs a light, sound, image, text, or other notification to the user to request a recommended corrective action.

The recommended action is an action to be taken by the user 126 with regard to the one or more items. The recommended action, in some examples, includes adding one or more items to the set of items 116 to restock the smart peg device 102, removing one or more incorrect items from the set of items 116 that do not belong on the smart peg device 102, remove excess or overstock items from the smart peg device 102, re-orienting/rearranging one or more items in the set of items 116 to improve visibility or accessibility of the item(s), and/or replacing one or more items in the set of items 116.

The notification 120 is sent to notify the user 126 as to a change in the status 118 and/or notify the user 126 as to a recommended corrective action. In still other examples, the notification 120 includes the sensor data 112. The remote computing device 124 analyzes the sensor data 112 to determine a status of the smart peg device and/or determine whether a corrective action should be taken. If a corrective action should be taken, the remote computing device 124 notifies the user 126 as to the recommended corrective action.

In some examples, the smart peg device 102 includes an integrated power source 130. In other examples, the power source 130 may include one or more power sources located externally to the smart peg device 102, as shown in FIG. 2.

The power source 130 may be implemented as one or more batteries, a wireless power source, a wired power source, solar power, or any other type of power source. A battery may include a lithium battery. The power source may include a solar power source if the smart peg device is near a window, skylight, or other appropriate light source compatible with a solar power device.

The remote computing device 124 represents any device executing instructions (e.g., as application programs, operating system functionality, or both) to implement the operations and functionality associated with the remote computing device 124. The remote computing device 124 may include a mobile computing device or any other portable device. In some examples, the mobile computing device includes a mobile cellular telephone, laptop, tablet, computing pad, netbook, smart watch, gaming device, and/or portable media player. The remote computing device 124 may also include less portable devices, such as desktop personal computers, kiosks, tabletop devices, and servers. Additionally, the remote computing device 124 may represent a group of processing units or other computing devices.

In some examples, the remote computing device 124 includes one or more processor(s) 134, a memory 136, and at least one user interface component 138. The processor(s) 134 includes any quantity of processing units, and is programmed to execute computer-executable instructions for implementing smart peg display monitoring. The instructions may be performed by one or more of the processor(s) 134, or performed by a processor external to the remote computing device 124. In some examples, the processor is programmed to execute instructions such as those illustrated in the figures (e.g. FIG. 8, FIG. 9, FIG. 10, FIG. 11, FIG. 12, and FIG. 13).

The remote computing device 124 further has one or more computer readable media such as the memory 136. The memory 136 includes any quantity of media associated with or accessible by the remote computing device 124. The memory 136 may be internal to the remote computing device 124 (as shown in FIG. 1), external to the computing device (not shown), or both (not shown).

The memory 136 shown in FIG. 1 stores a remote smart peg controller 140 and a calibration controller 146. The calibration controller 146 obtains item data associated with item 132. In some examples, the item data includes a predetermined weight of the item 132.

The calibration controller 146 in some examples utilizes the item data to generate calibration data 152. The calibration data 152 identifies the selected item 132 and/or a predetermine event.

The beacon device 128 obtains the calibration data 152 from the calibration device. In this example, the calibration device is remote computing device 124 generating the calibration data 152. The beacon device 128 in this example is a low-emitting beacon, such as, but not limited to, a BLUETOOTH device.

When the predetermined event occurs, the smart peg device 102 reactivates (power-on mode). During power-on mode, the mart peg device activates the set of sensors 114. The activated set of sensors 114 generates sensor data 112.

The remote smart peg controller 140 in some examples receives the sensor data 112 from one or more smart peg devices. The remote smart peg controller 140 analyzes the sensor data 112 to determine if corrective action is recommended based on a current status of the smart peg device 102 and the set of beacon criteria 122. If a corrective action is required, sending the notification 120 is authorized by the smart peg controller. If corrective action is not required based on the beacon criteria, sending the notification is not authorized.

In some examples, the smart peg controller generates the notification 120 and the beacon device transmits the notification. In other examples, the remote computing device 124 receiving the notification, outputs the notification data to the user 126 via the user interface component 138.

In still other examples, the remote computing device generates a notification and transmits the notification to one or more other computing devices associated with one or more other users. In yet another example, the remote computing device 124 stores the sensor data 112, the status 118, and/or the notification in a data storage device 144. The data storage device 144 in this example is a data storage remote from the smart peg device 102. In other examples, the data storage device 144 may be communicatively coupled to the smart peg device 102.

In some examples, the remote computing device 124 includes a communications interface component 142 for transmitting notifications, sensor data, and/or any other data to the remote data storage device, the smart peg device 102, and/or other remote computing devices. The communications interface component 142, in some examples, includes a network interface card and/or computer-executable instructions (e.g., a driver) for operating the network interface card. Communication between the computing device and other devices may occur using any protocol or mechanism over any wired or wireless connection. In some examples, the communications interface component 142 is operable with short range communication technologies such as by using NFC tags.

The user interface component 138, in some examples, includes a graphics card for displaying data to the user and receiving data from the user. The user interface component may also include computer-executable instructions (e.g., a driver) for operating the graphics card. Further, the user interface component 138 may include a display (e.g., a touch screen display or natural user interface) and/or computer-executable instructions (e.g., a driver) for operating the display. The user interface component 138 may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

FIG. 2 is an exemplary block diagram illustrating a smart peg display system including a network for calibrating smart peg devices and generating beacon notifications. A smart peg display 202 is a display including one or more smart peg devices. The smart peg devices may be attached to the smart peg display using brackets, hooks, magnets, clamps, screws, or any other attachment means for connecting a peg to a display.

In this non-limiting example, the smart peg display 202 includes a plurality of smart peg devices 204, such as the smart peg device 102 in FIG. 1. In this example, each smart peg device is assigned a unique peg ID. The unique peg ID may be an identifier such as, but not limited to, peg ID 150.

The plurality of smart peg devices 204 is associated with a plurality of items 206 displayed on one or more of the smart peg devices. An item is displayed on a smart peg device if the item is hanging on a portion of the smart peg device, hooked over a portion of the smart peg device, looped through a portion of the smart peg device, or resting on a portion of the smart peg device.

Each smart peg device in the plurality of smart peg devices may be an empty smart peg device having no items displayed on the smart peg device or a smart peg device having one or more items displayed on the smart peg device. In other words, different smart peg devices may include different numbers of items associated with each of the smart peg devices.

A plurality of sensors 208 are associated with the plurality of smart peg devices 204. In some examples, a smart peg device includes one or more sensors integrated within the smart peg device. In other examples, a smart peg device includes a smart peg device which is communicatively coupled to one or more sensors. In still other examples, the smart peg device includes a peg having one or more sensors attached or otherwise mounted to the peg.

The power source 210 includes one or more power source for providing power, such as electricity, to the plurality of smart peg devices 204. In some examples, a separate power source is associated with each smart peg device in the plurality of smart peg devices. In other examples, a single power source provides power to a group of two or more smart peg devices.

The smart peg display system 200 optionally includes a network 212. One or more of the smart peg devices in the plurality of smart peg devices sends a notification to one or more remote computing devices via the network 212. The network 212 is implemented by one or more physical network components, such as, but without limitation, routers, switches, network interface cards (NICs), and other network devices. The network 212 may be any type of network for enabling communications with remote computing devices, such as, but not limited to, a local area network (LAN), a subnet, a wide area network (WAN), a wireless (Wi-Fi) network, or any other type of network. In this example, the network 212 is a WAN accessible to the public, such as the Internet.

The remote computing devices may include a server 216 or a user device 218. The server 216 may include an item data repository 220. The item data repository 220 is a data storage for data associated with an item assigned to one or more smart peg devices in the plurality of smart peg devices 204. The item data repository 220 may be implemented as a database, a file system, or any other data storage. The item data repository 220 may be located on the server 216 or located remotely from the server 216.

In some examples, one or more smart peg devices are calibrated using item data 222 retrieved from the item data repository 220. The item data 222 is utilized to generate per-peg calibration data for a given smart peg device in the plurality of smart peg devices 204.

The item data repository 220 stores item data 222 associated with the plurality of items 206. The item data 222 in this example includes an item ID 224 and a predetermined item weight 225. The item data 222 in other examples may include item packaging dimensions, beacon criteria 226, or any other data associated with a given item. The beacon criteria 226 is a set of criteria for determining whether to send a beacon or other notification, such as, but not limited to, the set of beacon criteria 122 in FIG. 1. For example, the beacon criteria 226 may include a threshold minimum number of items on a peg prior to restocking the peg, a threshold maximum number of items to constitute a fully stocked peg, or any other criteria.

In this example, the user device 218 obtains an item ID of at least one item to be displayed on a given smart peg device. The user device 218 may optionally include a scanner 230. The scanner 230 optionally scans a barcode, such as a universal product code (UPC), matrix barcode, or other identifying mark on the given item to determine the item ID.

The user device 218 sends a request for item data associated with the item ID to the server 216. The server 216 retrieves the item data from the item data repository 220 and transmits the item data 222 to the user device 218. A calibration controller 228 utilizes the calibration data to determine one or more per-peg beacon interval(s) 240 for the plurality of smart peg devices.

The one or more per-peg beacon interval(s) may be generated by the smart peg controller on a smart peg device or by a calibration controller on a user device, server, or other remote computing device. The per-peg beacon interval is calculated based on the turn-over rate, context-data, and/or value of a particular item. For example, an item that has high value is assigned a more frequent beacon interval for closer monitoring of the high value items. A more frequent (shorter) beacon interval enables the smart peg device to determine a status of the high value items on a more frequent basis.

In another example, a popular item or an item that is expected to have higher sales/greater demand than other items are also given a shorter beacon interval. For example, a new cell phone with anticipated greater demand than other cell phone models are assigned a shorter beacon interval than the cell phones with a lower demand. This enables closer monitoring of cell phones in stock, location of cell phones on displays, quickly identify misplaced cell phones, and restock the cell phones more efficiently to prevent an empty peg (out-of-stock) situation which could lead to lost sales or customer dissatisfaction.

Likewise, if a smart peg status indicates the beacon interval for an item is in relatively low demand/too frequent checking (peg status infrequently indicates restocking or rearranging items on the peg), the beacon interval is increased to permit the smart peg device to remain in stand-by mode for longer periods of time. For example, if a beacon interval for a peg assigned to hold children's socks is set to a twenty-four-hour beacon interval, but the peg status at half the beacon intervals indicates the peg does not need to be restocked (no beacon sent), the per-peg beacon interval is updated to a forty-eight-hour beacon interval. This change occurs in response to the real-time status changes of the smart peg device, real-time context-data, and/or frequency of beacon transmissions.

In other examples, if the user determines the beacon interval is too short or too long, the user may manually update the beacon interval.

At an occurrence of a beacon interval for at least one smart peg device, the smart peg device analyzes sensor data generated by at least one sensor in the plurality of sensors 208 to determine if beacon criteria for sending a beacon notification is satisfied. If the criteria are satisfied, the beacon device 232 transmits a beacon notification to the beacon receiver 234 on at least one user device 218.

The beacon receiver 234 in some examples, includes a low-emitting beacon device for sending and receiving signals from beacon device 232. The beacon receiver 234 may be implemented as, without limitation, a BLUETOOTH device.

The beacon receiver 234 is paired with the beacon device 232 to transmit calibration data, such as the per-peg beacon interval(s) 240 and/or the beacon criteria 226, from the calibrating user device 218 to one or more smart peg devices of the smart peg display 202. The beacon receiver 234 pairs with the beacon device 232 to receive notifications one or more smart peg devices in the plurality of smart peg devices 204.

In other examples, one or more smart peg devices sends sensor data to the server 216 for analysis and/or storage of the sensor data. A smart peg controller 214 running on the server 216 analyzes the sensor data using a set of criteria to determine a status of a given smart peg device and/or determine whether a notification should be sent to one or more users. If a notification should be sent, the server 216 sends the notification to a user device 218 associated with at least one user.

The notification in some examples includes a recommended corrective action. The recommended corrective action may include a recommendation to restock a peg, rearrange items on a peg, remove items that do not belong on the peg, and/or replace a malfunctioning peg. A user associated with the user device 218 receiving the notification may optionally perform the recommended corrective action with regard to one or more of the smart peg devices.

In other examples, a smart peg controller running on a smart peg device analyzes the sensor data to determine a status of the smart peg device. The smart peg device sends the status to the server 216. The smart peg controller 214 on the server 216 determines whether to send a notification based on the status of the smart peg device and a set of notification criteria. If a notification should be sent, the server 216 generates the notification and sends it to the user device 218.

In still other examples, a smart peg controller on a smart peg device determines the status and whether to send a notification. In these examples, the smart peg device sends the beacon notification directly to the user device via the network 212 without intervention or involvement by the server 216.

The smart peg display system 200 may optionally include one or more context-data sources 236. A context-data source is a source of context-data 238. Context-data 238 is data associated with a location, region, a particular store, event, holiday, local custom, tradition, weather, or other context information. The server 216 and/or the user device 218 retrieves context-data 238 for utilization in generating calibration data and/or updating calibration data.

Sources of context-data includes data storage, server, a web-page or other Internet source, as well as user-provided context-data. For example, the smart peg display system 200 may obtain weather information from a weather application server, a weather web-site on the Internet, or from user provided input describing the weather.

For example, if the calibration controller 228 receives contextual-data indicating the weather forecast predicts rain every day for the next week, a machine learning component of the calibration controller 228 determines that demand for umbrellas, rain coats, rain boots, and other rain related items will increase. In response, the calibration controller 228 generates updated beacon interval for the rain-related items reflecting an expected increase in turnover for these items. More specifically, if the beacon interval for umbrellas is twenty-four hours, the updated beacon interval may be increased in frequency to every eight hours for the next week. The updated beacon interval is transmitted to the smart peg controller assigned to display umbrellas via updated calibration data.

In another example, if context-data indicates a popular sporting event is scheduled to air on television tomorrow, the machine learning component of the calibration controller predicts sales of snack food items will increase prior to the game. In response, the beacon interval for certain snack food items is increased until after the game in anticipation of the higher turnover rate for these items.

In still other examples, the smart peg device changes a per-peg beacon interval for a given item in response to seasonal changes, holidays, or other events. For example, during the summer, seasonal items such as insect repellant, sunscreen, and other items related to outdoor activities increase in turnover. Therefore, during the summer months, the smart peg device checks the number of these items on each peg device with increased frequency than during the winter months. For example, sunscreen may have a beacon interval of twenty-four hours in the winter months but have a beacon interval of ten hours in the summer months.

A data storage device 242 optionally stores the one or more per-peg beacon interval(s) 240 and/or the beacon criteria for one or more smart peg devices in the plurality of smart peg devices 204. The data storage device 242 may be connected to one or more of the smart peg devices via a wired or wireless communications network.

Figure 3:
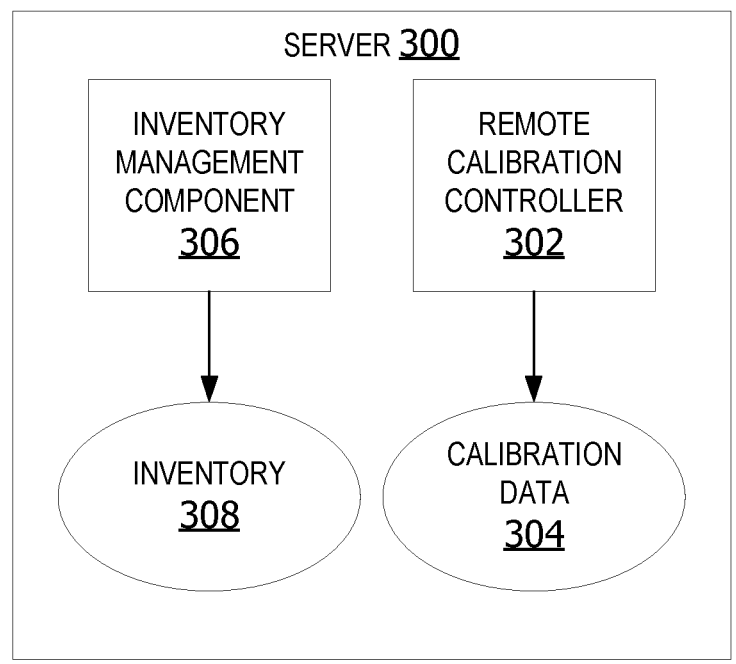
FIG. 3 is an exemplary block diagram illustrating a smart peg system utilizing sensor data from a plurality of smart peg devices to perform inventory management.

FIG. 3 is an exemplary block diagram illustrating a smart peg system utilizing sensor data from a plurality of smart peg devices to perform inventory management. The server 300 is a remote computing device receiving beacon notification data from a plurality of smart peg devices. In some examples, an inventory management component 306 receives beacon notification data, including smart peg device status data, from one or more smart peg devices via a network. In other examples, the beacon notification data may include the sensor data, as well as the status data.

The smart peg device status data includes data associated with a status of a peg, such as, but without limitation, peg ID identifying at least one smart peg device, at least one item ID of at last one type of item assigned to one or more pegs, number of items on one or more pegs, etc. In some examples, the beacon notification data and/or the smart peg device status data is transmitted to the server via a network. The server 300 receives the beacon notification data from a set of one or more user devices and/or a set of one or more smart peg devices. The beacon notification data is transmitted to the server periodically or on occurrence of a predetermined event.

The inventory management component 306 analyzes sensor data and/or smart peg device status data from a plurality of smart peg devices associated with a given location, such as the plurality of smart peg devices 204 in FIG. 2. The inventory management component 306 generates an inventory 308 for the location. The location may include a store or other retail location.

The inventory management component 306 may optionally receive beacon notification data, updated sensor data and/or an update status for each smart peg device in the plurality of smart peg devices. The inventory management component 306 uses the updated sensors data and/or updated status data to generate an updated inventory for the location. The updated inventory reflects changes to the number of items, weight or items, and/or arrangement of items associated with each peg device.

A remote calibration controller 302 obtains item data for an identified item from a user device, such as the remote computing device 124 in FIG. 1 or the user device 218 in FIG. 2. The remote calibration controller 302 generates calibration data 304, including the per-peg beacon interval based on the item data. The server 300 transmits the calibration data 304 to a user device. The user device transmits the calibration data to the smart peg device associated with the identified item.

Figure 4:
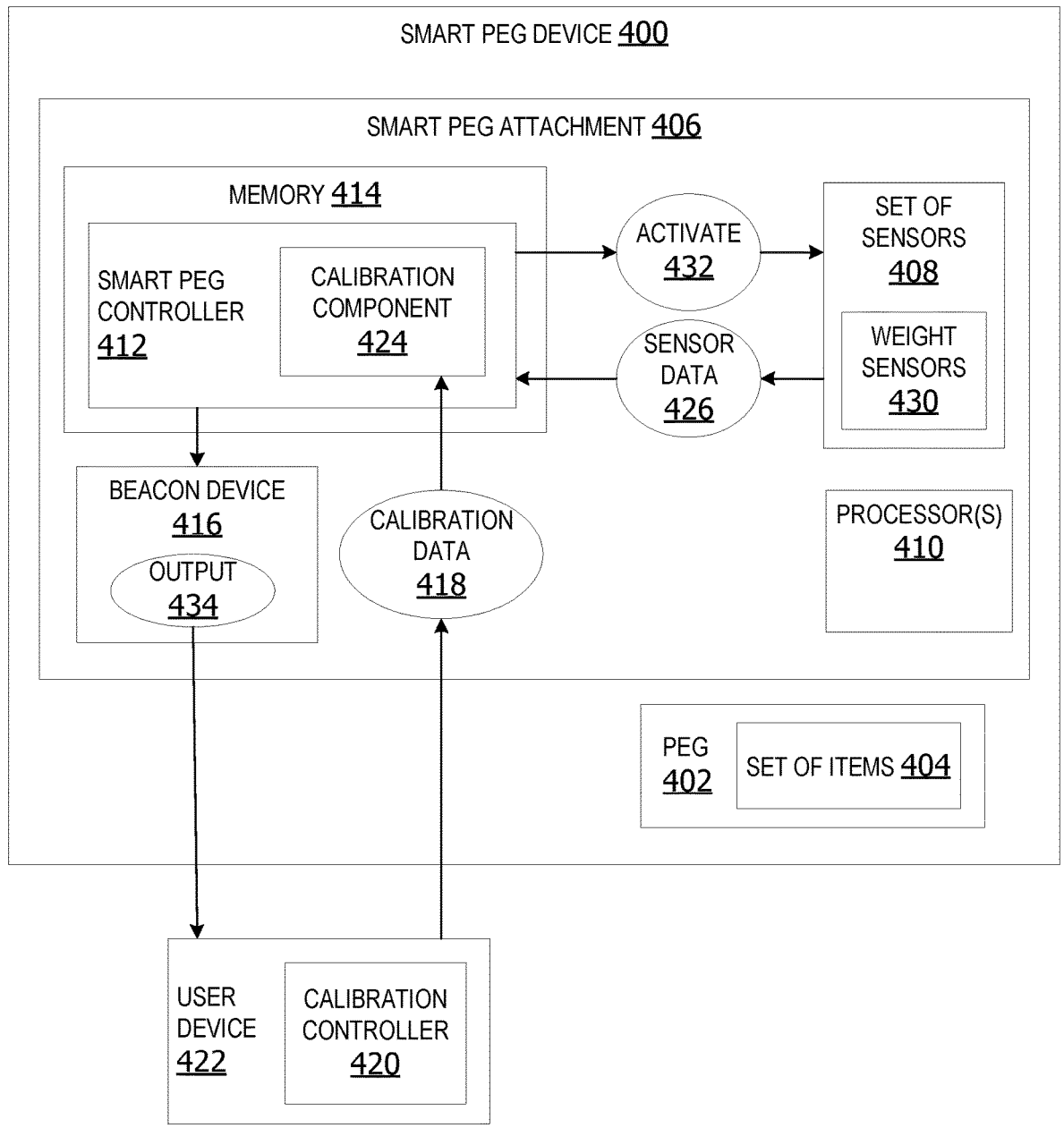
FIG. 4 is an exemplary block diagram illustrating a smart peg attachment associated with a peg.

FIG. 4 is an exemplary block diagram illustrating a smart peg attachment associated with a peg. A smart peg device 400 includes a peg 402, a set of items 404 displayed on the peg 402, and a smart peg attachment 406 coupled to the peg 402. The smart peg device 400 in this example is backwards compatible with a peg-board, shelf, or other legacy support device associated with a peg display.

The peg 402, in this non-limiting example, is a legacy peg device which does not include an integrated memory, processor, power source, or beacon. The set of items 404 includes one or more items. In other examples, the peg 402 may be an empty peg having no items associated with the peg 402.

The smart peg attachment 406 is a device having a memory 414 storing a smart peg controller 412, one or more processor(s) 410 executing the smart peg controller 412, a set of sensors 408 for generating sensor data associated with the set of items 404, and/or a beacon device 416 for sending a notification to one or more users. The notification may include a status and/or recommended corrective action(s).

The smart peg attachment 406 may be attached to any portion of the peg 402. For example, but without limitation, the smart peg attachment 406 may be attached or otherwise coupled to a base of the peg 402, an upper portion of the peg 402, a lower portion of the peg 402, or any other portion of the peg 402.

In some examples, a calibration controller 420 of a user device 422 paired with the smart peg device 400 obtains item data from an item data repository. The calibration controller 420 utilizes the item data to generate calibration data 418. The calibration data 418 in these examples may include a known weight of at least one item assigned to the smart peg device 400.

When in an active mode, the smart peg controller 412 obtains sensor data 426 from the set of sensors 408. The sensor data may include, without limitation, weight data, proximity data, and/or light detection data. The set of sensors 408 generate weight data measuring a weight of the set of items 404 hanging on the smart peg device 400. The smart peg controller 412 calculates the number of items in the set of items 404 hanging on the smart peg device 400 by dividing the total weight of the set of items 404 by the predetermined weight of the assigned item extracted from the calibration data 418.

The smart peg controller 412 in other examples determines if an incorrect item is placed on the smart peg attached based on the weight data received from the weight sensors and the predetermined weight of the assigned item(s) hanging on the peg. An incorrect item is a misplaced item that is not assigned to hang on the peg. In other words, the weight data is utilized to identify unassigned items placed on a given smart peg device. For example, if the item assigned to the smart peg device 400 is a cell phone case weighing three ounces (3 oz) and the total weight of the set of items is eight ounces (8 oz), the smart peg controller 412 determines that at least one incorrect item is hanging on the peg.

The total weight in this example is due to at least one incorrect item weighing more than the three ounces or less than three ounces. In one example, the incorrect item may be a memory stick weighing two ounces along with two of the assigned cell phone cases. In another example, the incorrect item may be an ink cartridge weighing four ounces on the peg along with a single cell phone case. In still another example, the incorrect item may be an item weighting eight ounces. In this example, there are no assigned items present on the peg. The smart peg device 400 outputs a beacon notification. The beacon device 416 transmits the output 434 to the user device 422.

The output 434 in some examples is a notification identifying the smart peg device 400 for restock or relocation of incorrect items on the peg. The output 434 may include one or more of a peg ID, an assigned item ID, an incorrect item ID, and/or a message. In this example, the output 434 includes a peg ID identifying the smart peg device generating the notification. A user device receiving the output 434 uses the peg ID to locate the smart peg device in need of attention from a user. The attention from a user may include restocking assigned items/adding items to the peg, removing incorrect items from the peg, rearranging items on the peg, recalibrating the peg, or replacing a defective/malfunctioning peg.

In other examples, the output 434 includes an item ID of the item assigned to the peg that requires restocking. A user device receiving the output notification including an item ID uses the item ID to identify the assigned item to be restocked. This enables a user associated with the user device to retrieve the appropriate assigned item for restocking the smart peg device without making a visual inspection of the items hanging on the smart peg device generating the beacon output 434.

In still other examples, the output 434 includes a message including a recommendation. The recommendation is a suggested action to be performed by a human user associated with the user device receiving the output beacon notification. A recommendation in the output 434 may include a recommendation to restock the peg, rearrange item(s) on the peg, remove misplaced item(s) from the peg, remove item(s) from an overstocked peg, recalibrate the smart peg controller, replace a malfunctioning peg, and/or replace a malfunctioning sensor.

In other examples, the calibration controller 420 generates updated calibration data. The updated calibration data may be generated using context data, item data associated with a new item assigned to the smart peg, or updated beacon interval data. The calibration controller 420 may generate an updated beacon interval and/or updated calibration data based on user input, new item data, and/or new context data.

Figure 5:
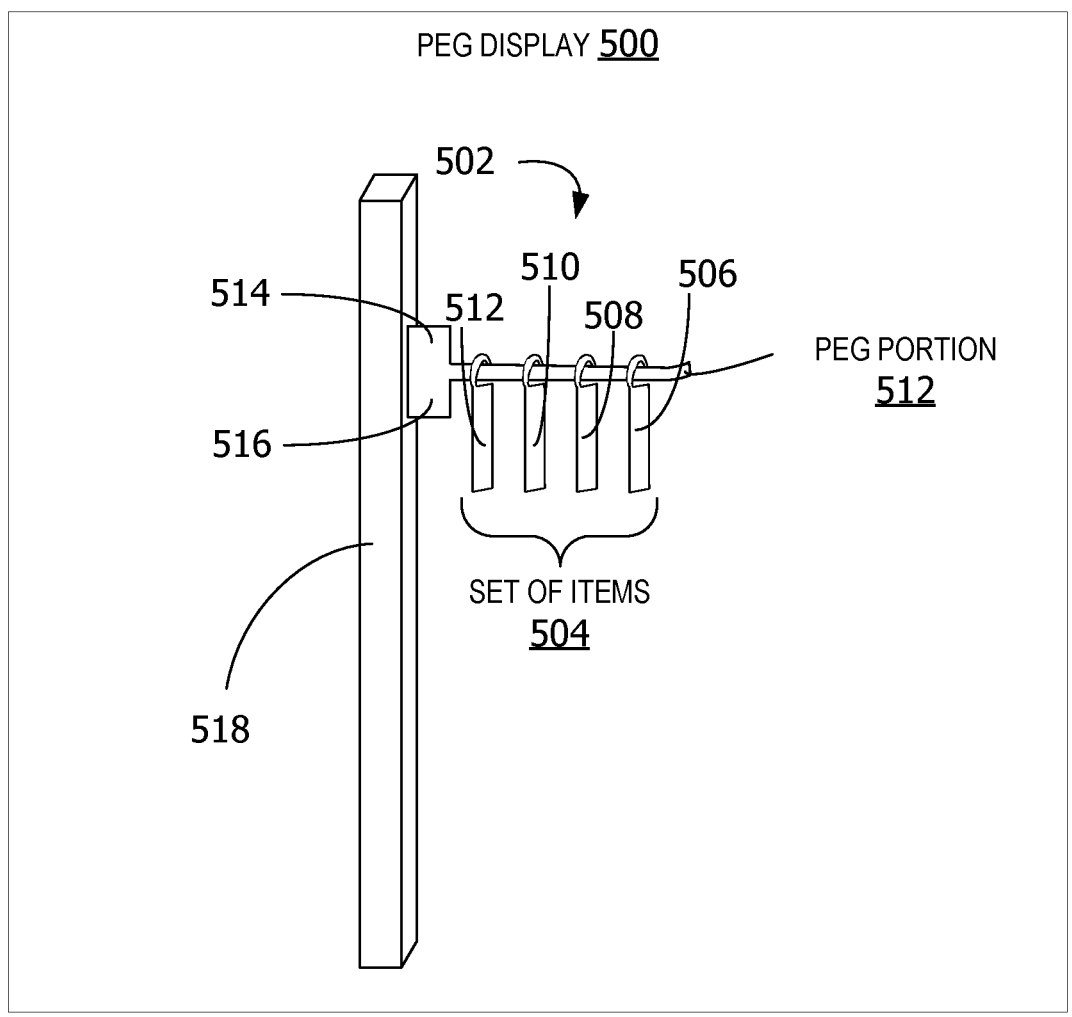
FIG. 5 is an exemplary block diagram illustrating a smart peg display associated with a set of items.

FIG. 5 is an exemplary block diagram illustrating a smart peg display 500 associated with a set of smart peg devices. The set of smart peg devices includes one or more smart peg devices, such as, but not limited to, the smart peg device 502.

The smart peg device 502 displays a set of items 504. In this example, the set of items 504 includes four (4) items, item 506, item 508, item 510, and item 512 hanging on a peg portion 512 of the smart peg device 502. In other examples, the smart peg device 502 may include no items, a single item, two items, three items, as well as five or more items.

The smart peg device 502, in this non-limiting example, includes an integrated processor, memory, a set of one or more sensors, and/or a beacon. The processor, memory, sensor(s), and/or beacon may be located in an upper portion of a base 514 of the smart peg device 502, in a lower portion of the base 516 of the smart peg device 502, or any other internal portion of the smart peg device.

In other examples, one or more processors, memory, sensor(s), and/or beacon(s) may be located externally to a peg rather than being located within the peg, as shown in FIG. 4 above.

The smart peg device 502 is optionally associated with a support 518. The support may be implemented as a wall, a shelf, post, a stand, a peg board, or any other type of support holding or supporting one or more pegs, such as smart peg device. The support 518 may be a portion of a display, showcase, wall, shelf, or board.

A smart peg controller analyzes sensor data associated with the set of items 504 to determine a status of the smart peg device 502. The status may include the number of items in the set of items 504, an identification of the items, and/or a location of each item in the set of items. For example, the status may indicate that item 506 is located at the front of the peg while item 512 is located at the back of the peg.

The status may also indicate items 508 and 510 are located in the middle of the peg. In this example, if a notification is sent, the notification may include a recommendation to move item 506 closer to the front end of the peg for improved visibility by customers, add additional items to the peg, and/or move the items 508-512 closer to the front of the peg.

The sensor data may be analyzed to determine whether the peg has an incorrect item status indicating an incorrect item is hanging on the peg. For example, if the status indicates that the smart peg device is assigned to display gift cards and item 510 is not a gift card, a notification may be sent to a user requesting the user take corrective action to remove the incorrect item 510 from the peg. The determination that the item 510 is not a gift card may be made based on an analysis of RFID sensor data identifying the item as something other than a gift card. The determination may also be made based on weight data indicating that a weight of item 510 is greater than a maximum weight for a gift card or less than a minimum weight of a gift card.

Figure 6:
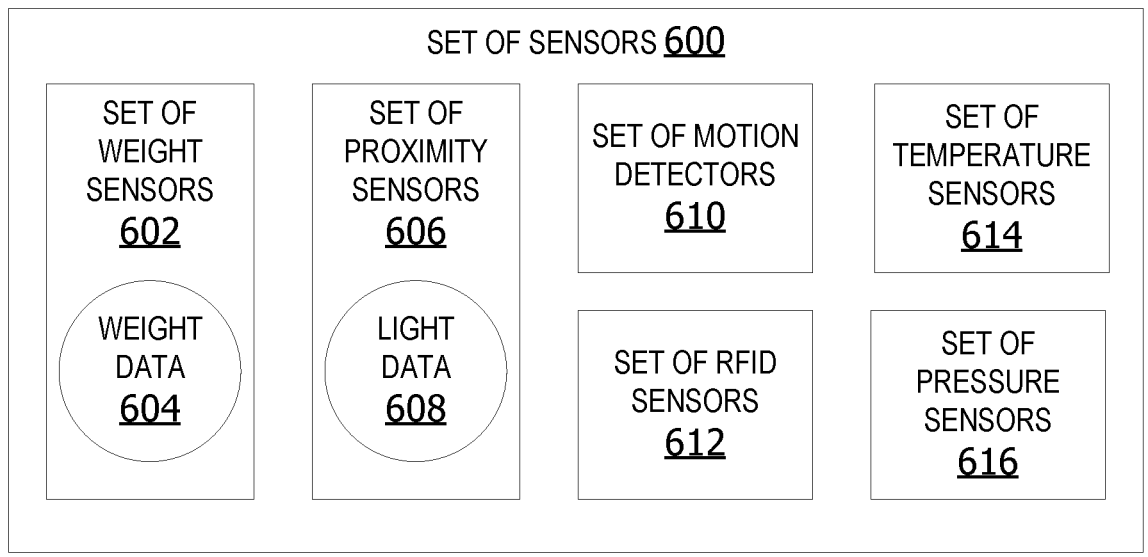
FIG. 6 is an exemplary block diagram illustrating a set of sensors associated with at least one smart peg device.

FIG. 6 is an exemplary block diagram illustrating a set of sensors 600 associated with at least one smart peg device. The set of sensors 600 includes one or more sensors for monitoring one or more items associated with a peg. The set of sensors 600 in some examples includes a set of one or more weight sensors 602. A weight sensor is attached to a smart peg device, integrated into a smart peg device, or otherwise in contact with a smart peg device. The set of weight sensors 602 generate weight data 604 associated with a set of sensors.

The weight data 604 indicates when a weight of a smart peg device or the weight of one or more items on the smart peg device changes. The smart peg controller analyzes the weight data with a known weight of the smart peg device and know weights of items assigned to the smart peg device to determine if an item is added to the smart peg device or removed from the smart peg device.

In other examples, the weight data indicates an increased weight on a peg when an item is added to the peg. The weight data likewise indicates a decreased weight when a user removes an item from a peg.

A smart peg controller retrieves a known weight of each item assigned to hang on the peg. The known weight is retrieved from a set of known/predetermined item weights stored in one or more databases, such as the set of databases 800 in FIG. 8 below.

For example, if packages of socks are supposed to hang on a particular peg, the smart peg controller retrieves the known/predetermined weight of a single pair of the assigned socks. The smart peg controller analyzes the current weight of items hanging on the peg with the known weight of a single package of socks to determine how many items are hanging on the peg. In one analysis, the smart peg controller divides the total current weight by the weight of a single package of socks to determine a number of sock packages hanging on the peg.

If a weight on the peg increases by an amount greater than a known weight of an item assigned to the peg or the weight increases by an amount less than a known weight of an item assigned to the peg, the smart peg controller determines that an incorrect item has been placed on the peg. For example, if a smart peg device is assigned to display one pound packages of nails, the smart peg controller determines one item has been removed from the peg if the weight on the peg decreases by one pound. Likewise, if the weight on the peg increases by one pound, the smart peg controller determines that an item has been placed on the peg.

In other examples, the smart peg controller utilizes a known weight of the peg when empty and the weight of the item(s) assigned to the peg to determine a status of the peg. If the weight data indicates the current weight of the peg and all items on the peg is equal to the weight of an empty peg, the smart peg controller determines the peg is empty.

In other examples, if the weight data indicates the current weight of the peg and all items on the smart peg device exceeds a maximum weight of a fully stocked peg, the smart peg controller determines the smart peg device is overstocked or stocked with items that do not belong on the peg.

In other examples, the set of sensors 600 includes a set of one or more proximity sensors 606. A proximity sensor is a device that detects light and/or changes in light. The set of proximity sensors 606 generates light data 608. The light data 608 indicates changes in light or light levels associated with a smart peg device.

When a user approaches a smart peg device, the set of proximity sensors 606 detect a change in light levels due to the user blocking the amount of light reaching the set of light sensors. The smart peg controller in some examples analyzes light data to determine when a user approaches a smart peg device.

In some examples, the smart peg controller utilizes weight data 604 and light data 608 to determine a status of the smart peg device. For example, the smart peg device may correlate changes in weight data with changes in light data to identify items being added to the peg or removed from a peg.

The set of sensors 600 in other examples may include a set of one or more motions detectors 610. A motion detector detects moving objects, such as movements by a human user. A smart peg controller may utilize motion data generated by the set of motion detectors to determine when items are added or removed from a peg.

The set of sensors 600 includes a set of one or more RFID sensors 612 in other examples. An RFID sensor is an RFID tag reader. In some examples, each item associated with a smart peg device includes an RFID tag. The RFID tag identifies the item and/or includes other data associated with the item. The RFID sensor reads data from one or more RFID to determine a location of the items on the peg. The RFID tag data may be utilized to determine what items are hanging on a peg, how many items are hanging on a peg, location of an item on the peg, when an item is removed from the peg, and/or whether an item removed from a peg is purchased by a user. For example, RFID tag data generated by the set of RFID sensors 612 may be analyzed to determine if an item is hanging at the front of the peg in view of customers, hanging at the back of a peg, hanging in the middle of the peg, etc.

In some examples, RFID tag data is utilized by one or more computing devices associated with the location to monitor an item removed from a peg by a user. As the user moves through the retail location, the RFID tag data indicates the current location of the item within the retail location. The RFID tag data may be utilized to determine whether the item is ultimately purchased by the user.

In still other examples, the set of sensors 600 optionally includes a set of one or more temperature sensors 614. The set of temperature sensors generate temperature data. The temperature data indicates changes in temperature associated with a peg. For example, if packages of cheese hang on a smart peg within a refrigerated display, the temperature sensor detects an increase in temperature when a user approaches the peg and/or removes an item from the peg.

A set of pressure sensors 616 may optionally be included in the set of sensors 600. A pressure sensor detects changes in pressure on the peg. The set of pressure sensors generates pressure data. A smart peg controller analyzes the pressure data to determine when an item is removed from a peg and/or added to a peg.

In still other examples, the set of sensors 600 may optionally include one or more cameras located remotely from a smart peg device. For example, image data associated with a camera may be analyzed to monitor a location of an item on a peg or monitor the location of the item after a user removes it from the peg.

Figure 7:
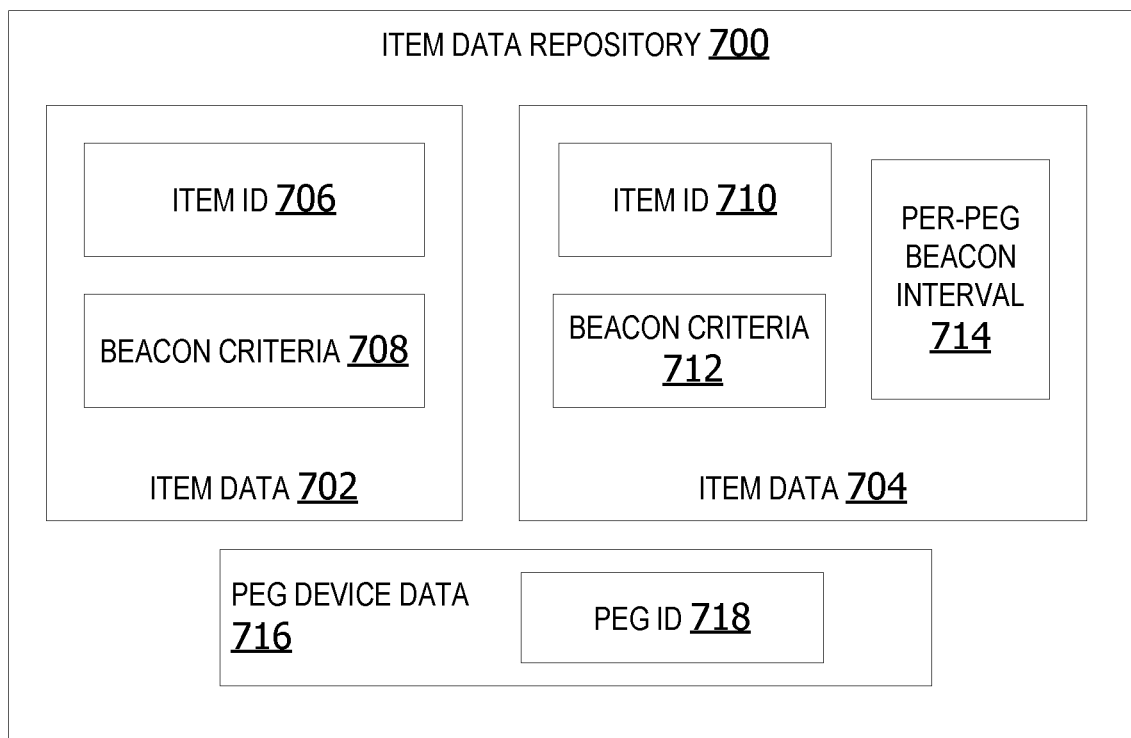
FIG. 7 is an exemplary block diagram illustrating an item data repository.

FIG. 7 is an exemplary block diagram illustrating an item data repository 700. The item repository 700 includes item data for one or more items, such as item data 702 and 704. Item data 702 in this example is associated with item ID 706. The beacon criteria 708 is a set of criteria for determining a status of a smart peg device and/or determining whether to send a beacon notification, such as the set of beacon criteria 122 in FIG. 1 and the beacon criteria 226 in FIG. 2. The beacon criteria 708 may include, without limitation, a threshold range of items to hang on the peg, a maximum number of items required for a peg to be fully stocked, and/or a minimum number of items prior to restocking.

In another example, the item data 704 may include an item ID 710 for an assigned item, beacon criteria 712 for the identified item, and/or a predetermined per-peg beacon interval 714 for the identified item.

Peg device data 716 may also be included in the item data repository 700. The peg device data 716 includes data associated with a particular peg device, such as a peg ID 718, a smart peg device weight, one or more items assigned to hang or display on the smart peg device, etc.

Figure 8:
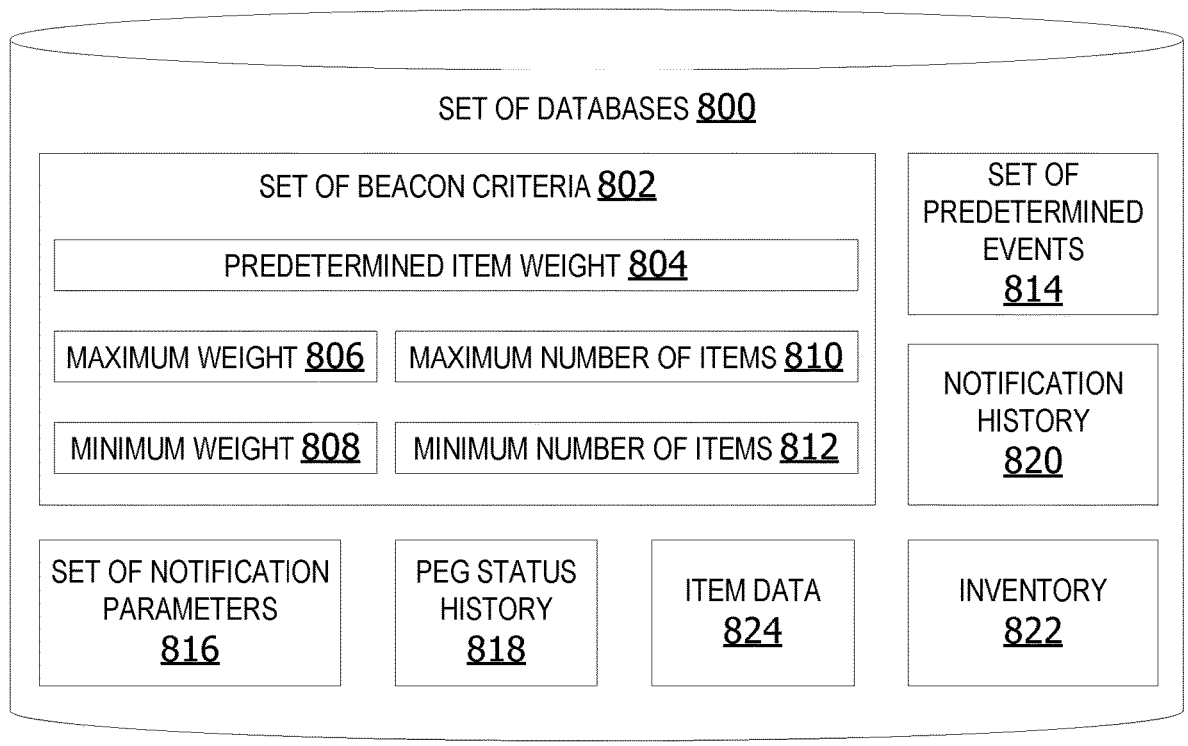
FIG. 8 is an exemplary block diagram illustrating a set of databases associated with a smart peg display.

FIG. 8 is an exemplary block diagram illustrating a set of databases 800 associated with a smart peg display. The set of databases 800 may be local to a smart peg device. In other examples, the set of databases 800 are located remotely to the smart peg device. In these examples, the smart peg device accesses the set of databases 800 via a network.

The set of databases 800 in this example includes a set of criteria 802. The set of criteria 802 are utilized by a smart peg controller to determine a status of a peg and/or determine whether to send a notification. The set of criteria 802 may include, without limitation, a predetermined weight of an item 804, a maximum weight 806 threshold, a minimum weight 808 threshold, a maximum number of items 810, and/or a minimum number of items 812.

The predetermined item weight 804 is a weight of one or more known items assigned to a peg. Several items on a peg may be determined by dividing a total weight of items on the peg by the weight of a single item assigned to hang on the peg.

The maximum weight 806 is a maximum total weight for the peg. If the weight of items on the peg exceeds the maximum weight 806, the smart peg controller determines the peg is overstocked with too many items or the peg is stocked with the wrong items.

The minimum weight 808 is a minimum weight of the items on the peg before a notification is sent. The minimum weight may be a weight of an empty peg or a weight of a peg with a minimum acceptable number of items before restocking the peg is necessary. For example, if a peg holds ten toy cars and the peg should be restocked when the peg holds five or fewer toy cars, the minimum weight may be the weight of five toy cars hanging on the peg. If the weight falls below this minimum weight, a beacon notification is sent recommending restocking the peg with additional toy cars.

The maximum number of items 810 is several items permitted to hang on the peg before a notification is sent to a user recommending removal of one or more items. For example, if the maximum number of shoes hanging on a peg is five and the status of the peg indicates six pairs of shoes, the number of shoes exceeds the maximum number. A notification is sent to a user recommending corrective action to remove a pair of shoes from the peg, in this example.

The minimum number of items 812 in some examples is the minimum number of items on a peg. If the number of items on the peg falls below the minimum number of items, the smart peg controller sends a notification recommending corrective action to restock the peg with one or more additional items.

A set of predetermined events 814 is a set of one or more predefined events that trigger activation of a smart peg device and/or sending of a notification. A predetermined event in the set of predetermined events may include receiving sensor data from a set of sensors, an occurrence of a beacon interval, a specified data and time, or a peg status. For example, a predetermined event may specify that the smart peg device activate and determine a status of the smart peg device every day at twelve o'clock noon.

In another example, a predetermined event may include a peg status. If a current peg status indicates a peg is empty, the empty peg status may be a predetermined event which triggers sending a notification.

The set of notification parameters 816 is a set of parameters specify contents of a notification, where to send a notification, whether to include sensor data in the notification, and/or when to send a notification. The parameters may specify one or more remote computing devices which have subscribed to receive notifications. The parameters in this example indicates a notification should be sent to each of the subscribing computing devices.

In other examples, the notification parameters may specify that a notification sent in response to an empty peg status be sent to a user device associated with a user tasked with restocking the peg. The notification parameters may specify whether to send the current peg status with sensor data to a remote computing device for further analysis in other examples.

In yet another example, the notification parameters may specify that a notification include only the peg status without a recommended action, sensor data, or any other additional information. For example, if a peg is fully stocked, a notification may be sent to a user device indicating the peg status is good because no user corrective action is required.

A peg status history 818 may optionally be stored on the set of databases. The peg status history 818 includes previous status of the peg with a time stamp or other indicator of when the status was generated. The status may indicate the number of items removed from the peg and/or added to the peg over time. The peg status history may indicate how frequently a peg is restocked over time.

A notification history 820 is an optional history of notifications sent by the smart peg device. The notification history may include the notification, status, and/or sensor data.

The inventory 822 is an optional record indicating a current or past inventory associated with a plurality of smart peg devices within a given location. The inventory may be periodically updated to reflect changes in smart peg device status occurring over a given period of time.

In some examples, the inventory 822 optionally includes inventory data, such as a known weight of individual items. The known weight of individual items may be used to determine a number of items on a peg and/or whether an item is hanging on the wrong peg using weight data for the peg and the known item weights.

The set of databases 800 may also include an item data repository storing item data 824, such as item data repository 700 in FIG. 7. The item data 824 includes an item ID, item weight, item package dimensions, smart peg ID on which the item is assigned (if known), and any other item data.

Figure 9:
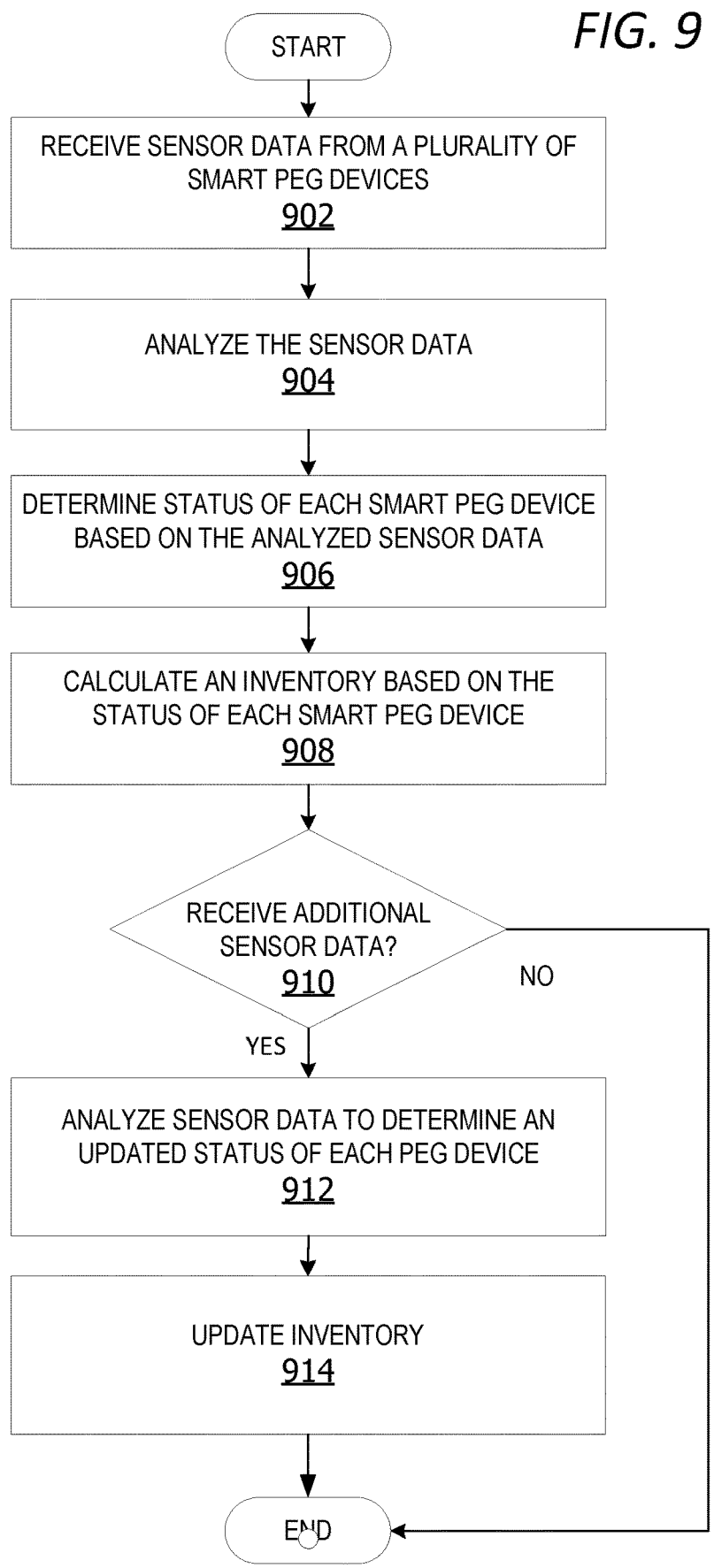
FIG. 9 is an exemplary flow chart illustrating operation of a computing device to perform inventory management using sensor data associated with a plurality of smart peg devices.

FIG. 9 is an exemplary flow chart illustrating operation of a computing device to perform inventory management using sensor data associated with a plurality of smart peg devices. The process shown in FIG. 9 may be performed by an inventory management component executing on a computing device, such as, but not limited to, the server 300 in FIG. 3.

The process begins by receiving sensor data from a plurality of smart peg device at operation 902. In some examples, the plurality of smart peg devices are smart peg devices within a given location, such as a store or other retail location. The inventory management component analyzes the sensor data at operation 904. The inventory management component in some examples analyzes the sensor data using a set of criteria for determining a status of each smart peg device in the plurality of smart peg device.

The inventory management component determines a status of each smart peg device in the plurality of smart peg devices based on the analyzed sensor data at operation 906. In other examples, the inventory management component receives a current status of each smart peg device with the sensor data. In some examples, the status of each smart peg device indicates a number of items and/or type of items associated with each smart peg device.

The inventory management component calculates an inventory of items for the location based on the status of each smart peg device at operation 908. For example, the inventory management component utilizes the status of each peg indicating the number of items and/or identification of items associated with each peg to determine the total number and/or identification of all items associated with all smart pegs for a given location. The inventory is automatically generated for all smart peg devices associated with a given location by the inventory management system.

The inventory management component determines if additional sensor data is received at operation 910. The additional sensor data is received from one or more smart peg devices in the plurality of smart peg devices. The additional sensor data may be received periodically at regular intervals. For example, inventories may be updated on a weekly, monthly, or quarterly interval.

In other examples, the additional sensor data is sent to the inventory management component on occurrence of a pre-determined event. The predetermined event may include a change in status of a given number of smart peg devices, a user request for an updated inventory, or any other predetermined event.

If additional sensor data is received, the inventory management component analyzes the additional sensor data to determine an updated status of each smart peg device in the plurality of smart peg devices at operation 912. The inventory management component updates the inventory for the location based on the updated status of the smart peg device(s) at operation 914. The process terminates thereafter.

Figure 10:
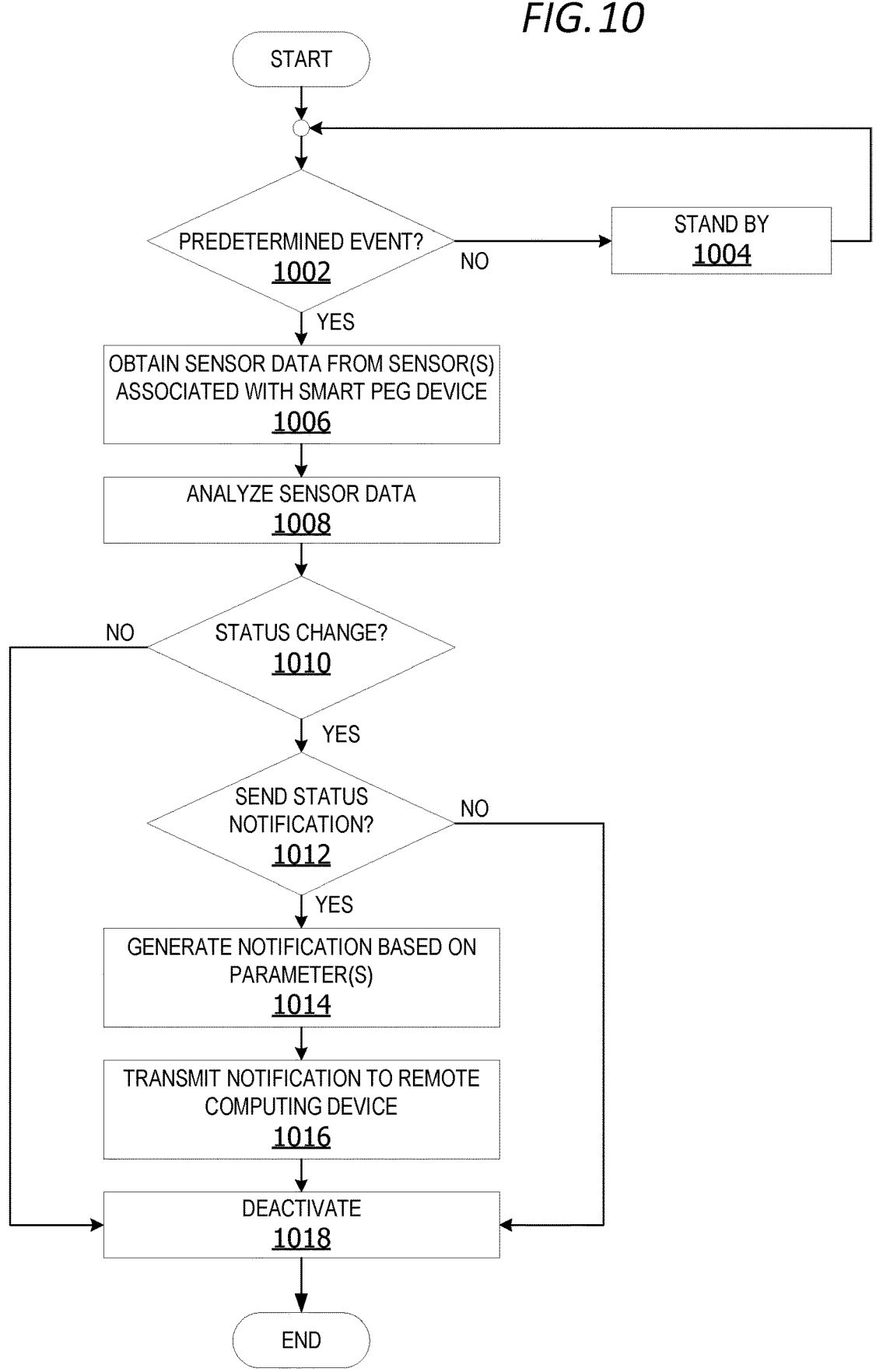
FIG. 10 is an exemplary flow chart illustrating operation of a computing device to monitor a smart peg display.

FIG. 10 is an exemplary flow chart illustrating operation of a computing device to monitor a smart peg display. The process shown in FIG. 10 may be performed by a smart peg controller executing on a smart peg device or a remote computing device, such as, but not limited to, the smart peg device 102 in FIG. 1, the remote computing device 124 in FIG. 1, the server 216 in FIG. 2, the plurality of smart peg devices 204 in FIG. 2, the server 300 in FIG. 3, the smart peg device 400 in FIG. 4, or the smart peg device 502 in FIG. 5.

The process begins by determined whether a predetermined event has occurred at operation 1002. In some examples, the predetermined event includes an occurrence of the per-peg beacon interval of time, a specified date, and/or selected time. For example, the predetermined event may occur at ten o'clock in the evening every day or on occurrence of a twenty-four-hour beacon interval.

In other examples, the predetermined event is a given state of the peg. For example, the predetermined event may occur when a peg is empty, the peg is broken or malfunctioning, a sensor is malfunctioning, or a peg is overstocked. In yet other examples, the predetermined event occurs when the smart peg controller receives sensor data from a set of sensors.

If the predetermined event has not occurred at operation 1002, the smart peg controller goes into a stand-by at operation 1004 until the predetermined event occurs. In some examples, the stand-by mode is a sleep or other low power state in which the sensors and beacon device are de-activated. During stand-by mode, sensor data is not generated or analyzed. In other examples, the stand-by mode includes de-activation of the smart peg controller until the pre-determined event occurs. When the pre-determined event occurs, the smart peg controller re-activates or wakes up out of the stand-by (low power/sleep) mode and enters an active (full power) mode.

On occurrence of the predetermined event, the smart peg controller obtains sensor data from one or more sensor(s) associated with at least one smart peg device at operation 1006. The smart peg controller in some examples requests or retrieves the sensor data from the set of sensors. In other examples, the sensor(s) automatically send the sensor data to the smart peg controller. The sensor(s) may send the data on occurrence of the predetermined event. For example, the sensor(s) may automatically send the sensor data periodically or at a specific date and time.

The smart peg controller analyzes the sensor data at operation 1008. The sensor data is analyzed in some examples using a set of criteria. The set of criteria may include weight data for items, one or more predetermined thresholds, or other criteria.

The smart peg controller determines if a status change has occurred at operation 1010. In some examples, the smart peg controller determines if a status change has occurred by analyzing the sensor data to determine how many items are hanging on a peg, where items are located on the peg, and/or whether correct items are hanging on the peg. If no status change has occurred, the smart peg controller deactivates at operation 1018. The process terminates thereafter.

Returning to operation 1010, if a status change is detected at operation 1010, the smart peg controller determines whether to send a beacon notification at operation 1012. The smart peg controller utilizes the set of criteria to determine whether to send the notification. For example, the set of criteria may indicate that a notification should be sent if there are five or fewer items on a peg but no notification should be sent if there are more than five items still associated with the peg. In other examples, the criteria may indicate a notification should only be sent if a peg is empty.

If a notification is not to be sent, the smart peg controller deactivates at operation 1018. The process terminates thereafter.

Returning to operation 1018, if one or more of the criteria indicate a notification should be sent, the smart peg controller generates a notification based on one or more notification parameters at operation 1014. The notification parameters indicate what information to include in the beacon notification, where to send the notification, how to send the notification, and/or whether to send sensor data with the notification. The notification parameters may also indicate a recommended corrective action for a given status change. For example, if a status change indicates an empty peg, the notification parameters instruct the smart peg controller to include a recommended "restock peg" corrective action in the notification.

The smart peg controller transmits the beacon notification to at least one remote computing device at operation 1016. The beacon notification may be sent via a network. In other example, the beacon notification is sent via a beacon in an absence of a network. In still other examples, the beacon notification may be sent directly to a user by activating one or lights and/or speakers associated with the smart peg device.

After sending the beacon notification, the smart peg device deactivates at operation 1018. The deactivation may include going into stand-by mode. The process terminates thereafter. In some examples, the smart peg device reactivates on occurrence of a next predetermined event.

While the operations illustrated in FIG. 10 are performed by a smart peg device or other computing device, aspects of the disclosure contemplate performance of the operations by other entities. For example, a cloud service may perform one or more of the operations.

Figure 11:
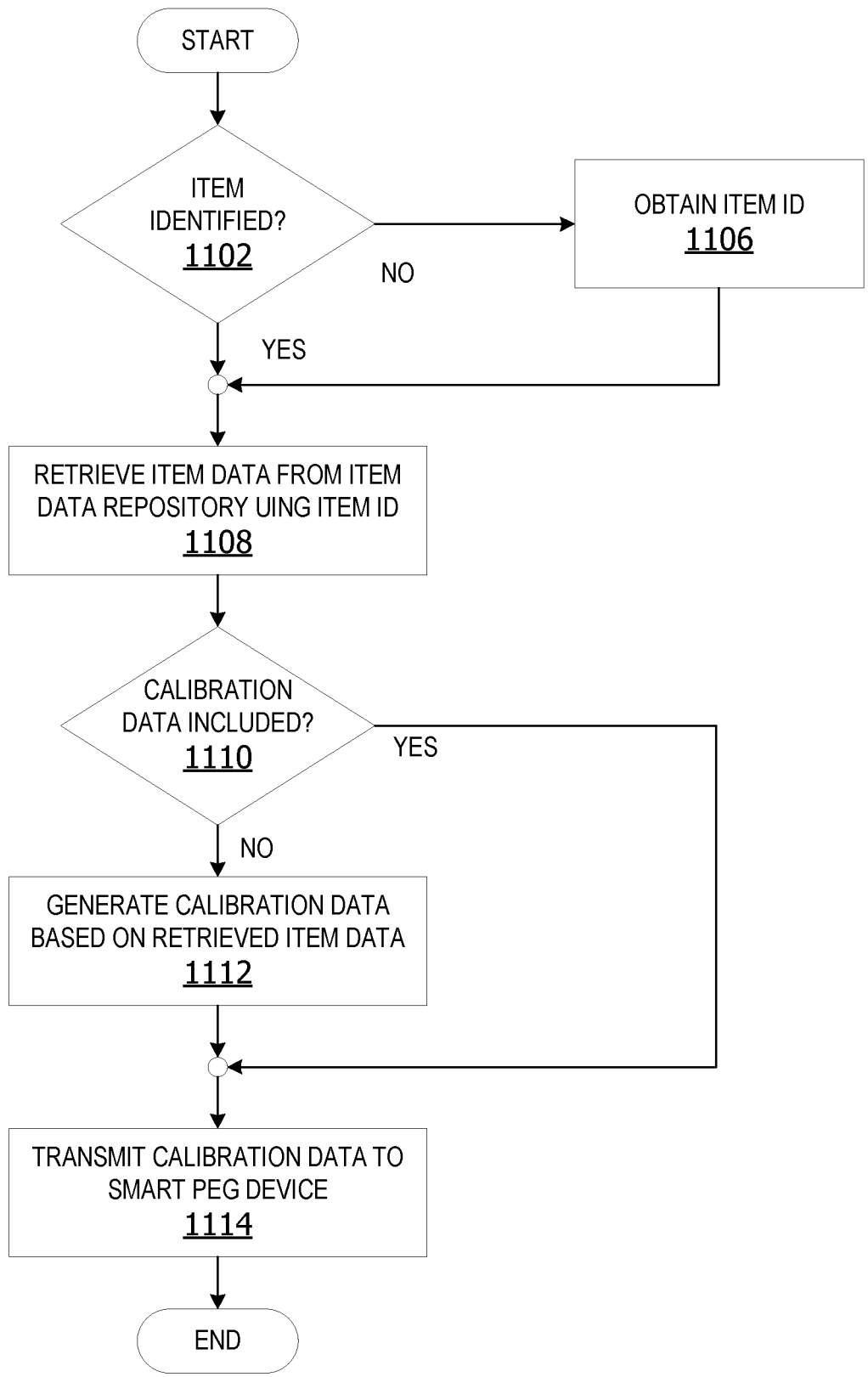
FIG. 11 is an exemplary flow chart illustrating operation of a computing device to generate calibration data for a smart peg device.

FIG. 11 is an exemplary flow chart illustrating operation of a computing device to generate calibration data for a smart peg device. The process shown in FIG. 11 may be performed by a calibration controller on remote computing device or a calibration controller on a smart peg device, such as, but not limited to, the smart peg device 102 in FIG. 1, the remote computing device 124 in FIG. 1, the server 216 in FIG. 2, the plurality of smart peg devices 204 in FIG. 2, the server 300 in FIG. 3, the smart peg device 400 in FIG. 4, the user device 422 in FIG. 4, or the smart peg device 502 in FIG. 5.

The process begins by determining whether an item assigned to a smart peg device is identified at operation 1102. The determination is made by a calibration controller on a computing device, such as the calibration component 148 in FIG. 1, calibration controller 228 in FIG. 2, remote calibration controller 302 in FIG. 3, calibration controller 420 or calibration component 424 in FIG. 4, or smart peg device 502 in FIG. 5.

If the item is not identified, the item ID is obtained at operation 1106. The item ID may be obtained by scanning a barcode on the item via a scanner, such as scanner 230 in FIG. 2. The item ID may be received as manual input from a user via a user interface, such as the user interface component 138 in FIG. 1.

Item data is retrieved from an item data repository using the item ID at operation 1108. If calibration data is not included in the retrieved item data at operation 1110, calibration data is generated based on the retrieved item data at operation 1112. The calibration data is data including a per-peg beacon interval, an item ID, and/or beacon criteria data, such as the calibration data 304 in FIG. 3 and the calibration data 418 in FIG. 4.

The calibration data is transmitted to the smart peg device associated with the identified item at operation 1114. The calibration data is transmitted by a user device or server, such as the remote computing device 124 in FIG. 1, the user device 218 in FIG. 2, the server 300 in FIG. 3, or the user device 422 in FIG. 4. The process terminates thereafter.

While the operations illustrated in FIG. 11 are performed by a smart peg device or other computing device, aspects of the disclosure contemplate performance of the operations by other entities. For example, a cloud service may perform one or more of the operations.

Figure 12:
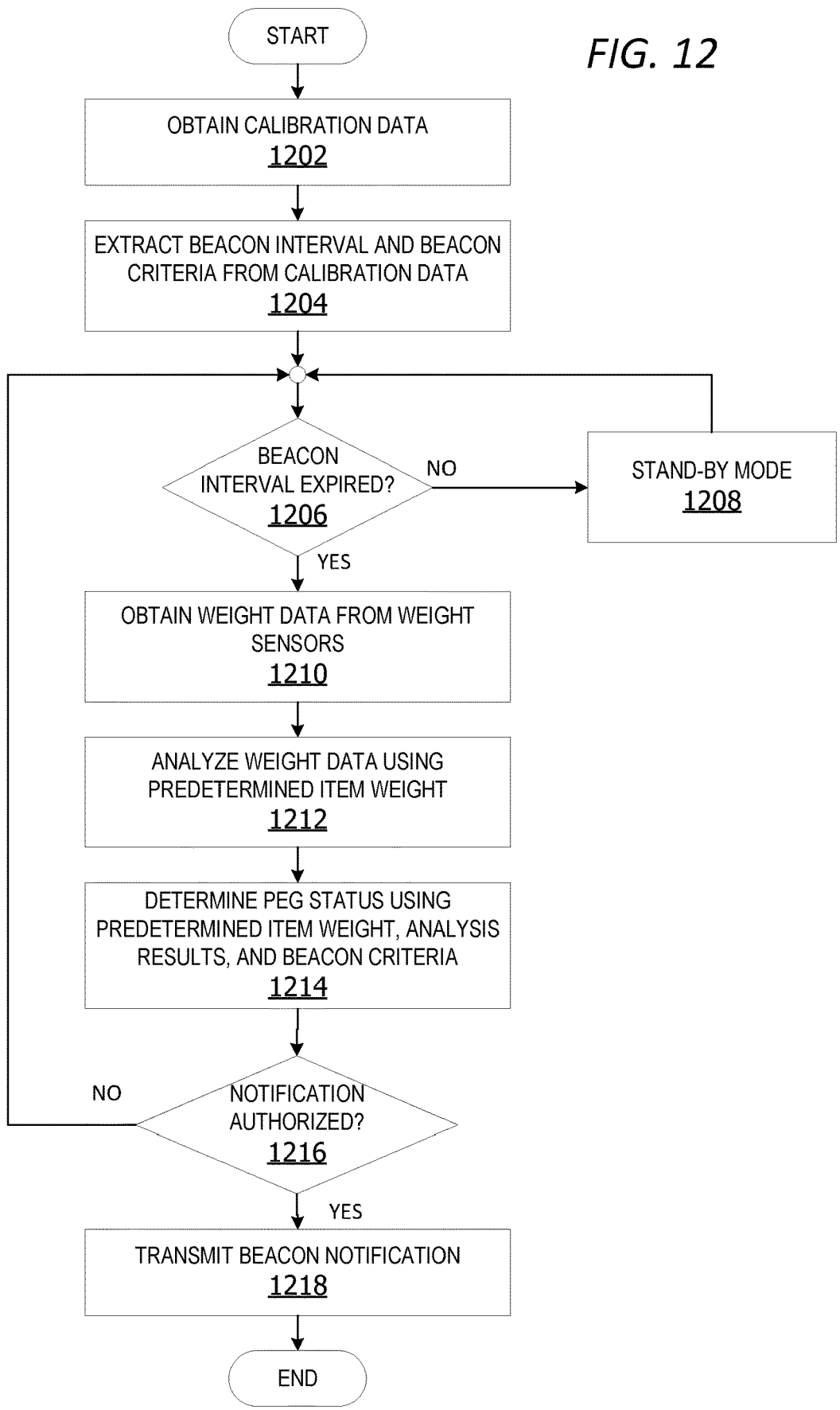
FIG. 12 is an exemplary flow chart illustrating operation of a computing device to determine whether to activate a beacon based on calibration data.

FIG. 12 is an exemplary flow chart illustrating operation of a computing device to determine whether to activate a beacon based on calibration data. The process shown in FIG. 12 may be performed by a smart peg controller executing on a smart peg device or a remote computing device, such as, but not limited to, the smart peg device 102 in FIG. 1, the remote computing device 124 in FIG. 1, the server 216 in FIG. 2, the plurality of smart peg devices 204 in FIG. 2, the server 300 in FIG. 3, the smart peg device 400 in FIG. 4, or the smart peg device 502 in FIG. 5.

The process begins by obtaining calibration data at operation 1202. The calibration data is obtained by a smart peg device, such as the smart peg device 102 in FIG. 1. The beacon interval and beacon criteria are extracted from the calibration data at operation 1204. The beacon interval is a per-peg beacon interval, such as the per-peg beacon interval(s) 240 in FIG. 2. The beacon interval and beacon criteria are extracted by a calibration component in a smart peg device, such as the calibration component 148 in FIG. 1 or the calibration component 228 in FIG. 2.

A determination whether the beacon interval is expired is made at operation 1206 by the smart peg controller, such as the smart peg controller 110 in FIG. 1 and the smart peg controller 412 in FIG. 4. If no, the smart peg device remains in a stand-by mode at operation 1208. The stand-by mode is a power-off or low power mode. When the beacon interval is expired at operation 1206, weight data is obtained from the weight sensors at operation 1210. In other examples, data may be obtained from other sensors, such as proximity sensors and/or light sensors.

The weight data is analyzed using predetermined item weight data at operation 1212. The predetermined item weight data is extracted from the calibration data by the calibration component in some examples. A peg status is determined using the predetermined item weight, beacon criteria, and the analysis results at operation 1214. In some examples, the item weight data and weight sensor data is utilized to determine a number of items on the peg, whether the peg is overstocked (too heavy), understocked, empty, or displaying incorrect items.

A determination whether sending a beacon notification is authorized is made at operation 1216. The beacon notification transmission is authorized if beacon criteria are satisfied. If no, the process returns operation 1206 to determine whether a beacon interval is expired at operation 1206. If the next beacon interval is not expired, the smart peg device returns to stand-by mode at operation 1208. The process iteratively executes operations 1206 through 1216 until sending a beacon notification is authorized at operation 1216. The beacon notification is transmitted at operation 1218 by a beacon device, such as the beacon device 128 in FIG. 1, beacon device 232 in FIG. 2, or beacon device 416 in FIG. 4. The process terminates thereafter.

While the operations illustrated in FIG. 12 are performed by a smart peg device or other computing device, aspects of the disclosure contemplate performance of the operations by other entities. For example, a cloud service may perform one or more of the operations.

Figure 13:
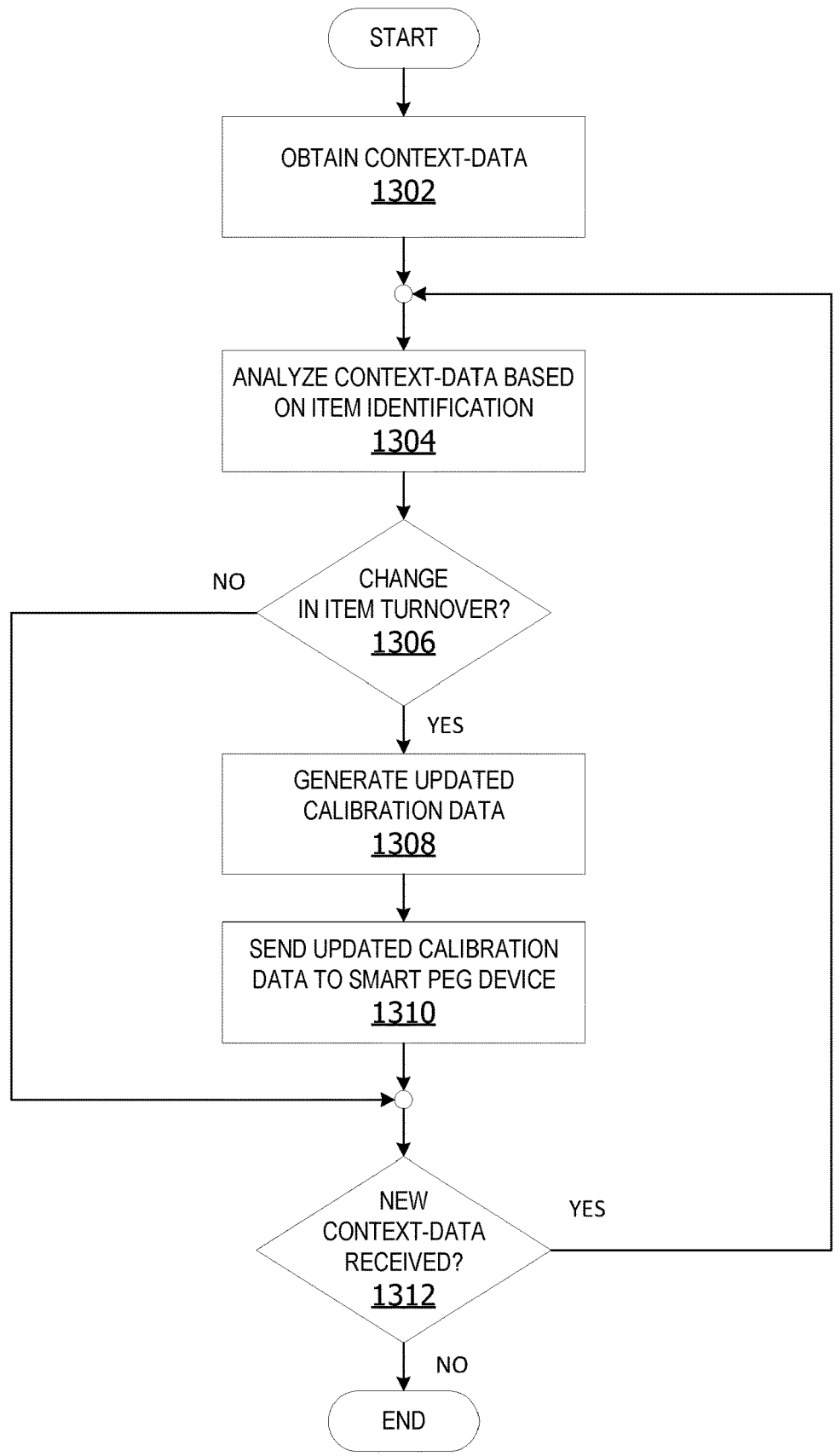
FIG. 13 is an exemplary flow chart illustrating operation of a computing device to update a per-page beacon interval based on context-data.

FIG. 13 is an exemplary flow chart illustrating operation of a computing device to update a per-page beacon interval based on context-data. The process shown in FIG. 11 may be performed by a calibration controller on remote computing device or a calibration controller on a smart peg device, such as, but not limited to, the smart peg device 102 in FIG. 1, the remote computing device 124 in FIG. 1, the server 216 in FIG. 2, the plurality of smart peg devices 204 in FIG. 2, the server 300 in FIG. 3, the smart peg device 400 in FIG. 4, the user device 422 in FIG. 4, or the smart peg device 502 in FIG. 5.

The process begins by obtaining context-data at operation 1302. The context-data is real-time data associated with the location, region, weather, events, holidays, transaction data, or other contextual data, such as context-data 238 in FIG. 2. The context-data is received from one or more sources of context-data, such as, but not limited to, a remote computing device 124 in FIG. 1, server 216 in FIG. 2, context-data sources 236 in FIG. 2.

The context-data is analyzed based on item identification at operation 1302. The context-data is analyzed by the calibration controller to determine whether there is a change in item turnover. If there is no change in item turnover at operation 1306, a determination is made as to whether new context-data is received at operation 1312. If yes, the process returns to operation 1304. Operations 1304 through 1312 are iteratively executed until no new context-data is received at operation 1312. The process terminates thereafter.

If there is a change in item turnover at operation 1306, updated calibration data is generated at operation 1308. The updated calibration data is generated by the calibration controller. The updated calibration data is sent to the smart peg device at operation 1310. In some examples, the updated calibration data includes an updated beacon interval. A determination is made as to whether new context-data is received at operation 1312. If no, the process terminates thereafter.

While the operations illustrated in FIG. 10 are performed by a smart peg device or other computing device, aspects of the disclosure contemplate performance of the operations by other entities. For example, a cloud service may perform one or more of the operations.

Additional Examples

In some examples, a smart peg device includes a proximity sensor at the base of the smart peg device. When a user steps away from the smart peg device, the proximity sensor senses an item has been removed from the peg.

In other examples, the smart peg device includes a weight sensor. When a user removes an item, the weight of items on the peg decreases. The smart peg device utilizes the proximity sensor data and/or weight data to determine when items are removed from the peg and/or added to the peg.

When the last item is removed from the peg, the smart peg device, in some examples, activates a beacon. The smart peg device communicates directly to the associate's user device via the beacon device, without requiring connection to a cloud server or other cloud system. In this example, as a store associate walks the floor with a wireless, user device, the user device picks up the beacon signal. The user device sends a notification to a store computing system or remove server that has subscribed to receive notifications. Appropriate action is the taken by the associate and consuming systems. For example, the consuming systems may update alerts, trigger restocking/replenishment, etc. Likewise, the associate may restock the peg or remove the peg.

In other examples, items associated with a smart peg device which are identified as high value or priority items are monitored after the items are removed from the smart peg device via RFID tag data. An item may be a priority item if it is a valuable item/high priced item. An item may be a priority item if it is a particular class of item, such as certain medications, spray paints, flammable liquids, or items that may be potentially hazardous.

In these examples, priority items may be tracked using sensor data gathered by sensors throughout the retail location. The sensor data may include, without limitation, RFID tag data or camera data generated by a set of one or more cameras. The sensor data is analyzed to determine a location of the priority item after the item is removed from the tag. This continued monitoring permits the smart peg device, a server, or other computing device to determine whether the priority item is purchased or discarded in an inappropriate area of the retail location.

A smart peg device in some examples includes an RFID tag reader in the set of sensors. The RFID tag reader obtains item data from an RFID tag associated with each item in the set of items on the peg portion of the smart peg device. The RFID tag data may include an item ID, predetermined item weight, etc. The smart peg device is not limited to determining if an item is in the correct general section of the store. Instead, the smart peg device not only determines whether an item is in the correct area of the store but also determines a more precise location of an item, such as a particular peg on which an item is currently located. The location of an assigned item on correct peg or misplaced item on the wrong peg may be determined by analyzing the RFID tag data. The smart peg device determines whether a correct item is on the correct peg; whether a particular peg is fully or partially stocked with correct items; and/or whether a particular peg is empty.

In some examples, the beacon notification sent to the user device in this example include a Peg ID for a peg on which the one or more items are located to improve identification of the location of one or more items relative to the smart peg device with improved vertical granularity. Vertical granularity refers to locating an item on a display having vertical rows of pegs on a display. Rather than simply indicating an item is located somewhere on a display, the smart peg device output indicates the specific peg and/or location of the peg on which an item of interest is located.

For example, if a priority item, such as a video game system, is removed from a peg, the smart peg device associated with the video game system alerts one or more other computing devices to monitor the priority item until it is purchased. When point of sale (POS) data indicate the item has been purchased, the monitoring is terminated. However, if the video game system is instead left in a different part of the retail location, such as a clothing aisle, a notification may be sent to recommend store personnel retrieve the item and return it to its proper location. Returning a product to its proper location may be referred to as rezoning the item. This enables more efficient maintenance of items and store organization ensuing customers are able to find products in their designated areas.

In still other examples, if a high priority item is being monitored through a retail location, the monitoring enables a determination of location of the item prior to purchase. The one or more computing devices monitoring the high priority item may analyze sensor data to determine if the high priority item is removed from the retail location prior to purchase and alert appropriate store personnel. This prevents and/or reduces loss of merchandise while increasing security for high priority items.

A store associate or another worker scans an item assigned to a particular smart peg device, in one example. The item is scanned using a handheld scanner or other scanning device. The scanner retrieves an item ID which is used to obtain item data from a back-end server. A user device utilizes the item ID to retrieve the item data. The item data includes an item weight, number of items that should be placed on the peg, etc. The associate hangs the correct number of the assigned items on the peg device. The user device transmits calibration data to the smart peg device to set the item weight, provide beacon criteria, and/or set a predetermined event for smart peg device activation. The smart peg device in this example does not have network connectivity. The smart peg device relies on the user device to provide the calibration data via the beacon transmission for calibration. After calibration and stocking of the smart peg device, the smart peg device in this example goes into a stand-by mode until an occurrence of the predetermined event to conserver power and ensure low resource usage by the smart peg device.

A calibration component on the user device or a back-end server calculates a per-peg beacon interval for a given smart peg device during a calibration phase based on a type of item assigned to the smart peg device being calibrated, in other examples. A smart peg device checks item status more frequently (shorter beacon interval) for high value items. In other examples, the per-peg beacon interval is adjusted/ modified during one or more re-calibration phases based on seasonality, geographic location of the retail store in which the smart peg device is located, local events, weather, and other context-specific factors. In still other examples, a smart peg device does not require calibration after it is placed or attached to a smart peg display. The smart peg device is calibrated once during initial setup. Afterwards, additional calibration is unnecessary. This improves user efficiency and reduces maintenance requirements.

In yet other examples, an inventory management component utilizes sensor data from a plurality of smart peg devices to generate inventories of items associated with one or more peg displays. This improves inventory generation speed, improves accuracy of the generated inventories, and reduces human resources required to complete inventories. The autonomous inventory generation further reduces inventory errors and omissions due to human error.

In still other examples, the notification criteria, parameters for generating a notification, corrective actions, thresholds, and other data associated with a smart peg display is stored on a remote data storage device. The remote data storage device is accessed via a network. This reduces memory usage and data storage requirements on the smart peg display.

A smart peg device having at least one weight sensor in one example is calibrated to activate on a per-peg beacon interval of ten hours. In this example, every ten hours, the smart peg device switches from a stand-by mode to an active mode and checks weight data. The smart peg device utilizes the weight data to identify changes in the weight data and/or calculate how many items are on a peg portion of the smart peg device. A weight discrepancy in this example indicates a misplaced item. The beacon criteria are utilized by the smart peg device to determine if a beacon notification should be transmitted/emitted with a message. The message may include a recommended action to restock the peg, check placement of items on the peg, move items to a front portion of the peg, remove misplaced items, etc. One or more items may be moved from a back or middle portion of the peg to a front portion of the peg to improve visibility and/or accessibility of the one or more rearranged item(s) on the peg.

Alternatively, or in addition to the other examples described herein, examples include any combination of the following:
  a beacon component configured to transmit the generated beacon notification to the at least one remote computing device;
  at least one weight sensor configured to capture weight data for a set of items associated with the smart peg device;
  identify the status of the smart peg device based on the captured weight data and the predetermined weight of the assigned item, wherein the weight data indicates a total weight of the set of items divided by the predetermined weight of the assigned item to calculate a total number of items in the set of items and/or identify unassigned items in the set of items.
  obtaining item data associated with the at least one item assigned to the smart peg device from an item data repository; calculates a per-peg beacon interval based on the item data detecting at least one of removal of the at least one item associated with the smart peg device or addition of at least one other item to the smart peg device based on the captured light data;
  wherein the set of sensors comprises at least one of a proximity sensor, a weight sensor, a motion detector, a radio frequency identification (RFID) sensor, a pressure sensor, or a temperature sensor;
  a light coupled to the smart peg device, wherein the smart peg controller activates the light to request corrective action to the smart peg device;
  wherein the corrective action comprises at least one of restocking the at least one item associated with the smart peg device, re-orienting the at least one item associated with the smart peg device, or removing the at least one item from the smart peg device;
  wherein the set of criteria comprises at least one of a maximum weight criteria, a minimum weight criteria, a maximum number of items, or a minimum number of items;
  a plurality of smart peg devices associated with a retail location, the plurality of smart peg devices generating sensor data associated with a plurality of items associated with the retail location;
  a network configured to transmit the sensor data to a remote server, an inventory management component of the remote server analyzing the sensor data to determine a current inventory of items associated with the retail location;
  a memory associated with the smart peg device, the smart peg controller storing the sensor data on the memory;
  a remote data storage device, the smart peg controller transmitting the sensor data to the remote data storage device for storage via a network;
  automatically de-activating the at least one smart peg device in response to determining no change in the status of the at least one peg device has occurred;
  wherein the predetermined event is at least one of a predetermined time interval, a predetermined date and time, an activation signal received from a remote computing device, or sensor data received from the set of sensors;
  wherein the remote computing device receives sensor data from a plurality of smart peg devices, analyzes the received sensor data to determine one or more individual statuses of individual smart peg devices in the plurality of smart peg devices, and calculates an inventory of items associated with the plurality of smart peg devices based on the individual statuses of each smart peg device;
  the individual statuses of each smart peg device in a plurality of smart peg devices indicates at least one of a number of items associated with an individual smart peg device or a location of at least one item associated with the individual smart peg device;
  automatically de-activating the at least one smart peg device in response to transmitting the generated beacon notification;
  wherein the corrective action comprises at least one of restocking the at least one item associated with the r smart peg display, re-orienting the at least one item associated with the at least one smart peg display, or removing the at least one item associated with the at least one smart peg display;
  wherein the at least one criteria further comprises at least one of a maximum weight, a minimum weight, a number of items associated with the at least one smart peg device, an operational status of the at least one smart peg device, or a capacity of the at least one smart peg device;
generating the beacon notification in accordance with a set of notification parameters;
outputting the generated beacon notification to a mobile computing device via a beacon associated with the smart peg controller;
activating the smart peg controller to analyze sensor data on occurrence of a predetermined event; and
de-activating the smart peg controller after transmitting the beacon notification to the at least one remote computing device;
wherein the beacon notification comprises a peg identifier (ID), an item ID, and a recommended corrective action;
automatically switching to a stand-by mode in response to transmitting the generated beacon notification until an occurrence of a next per-peg beacon interval;
obtaining context-data from a set of context-data sources; and
generating an updated per-peg beacon interval based on the context-data;
obtaining context-data associated with at least one item assigned to the smart peg device from a set of context-data sources; and
generating updated calibration data based on the context-data and item data associated with the at least one item.

At least a portion of the functionality of the various elements in FIG. 1, FIG. 2, FIG. 3, FIG. 4, FIG. 5, FIG. 6, FIG. 7, and FIG. 8 may be performed by other elements in FIG. 1, FIG. 2, FIG. 3, FIG. 4, FIG. 5, FIG. 6, FIG. 7, and FIG. 8 or an entity (e.g., processor, web service, server, application program, computing device, etc.) not shown in FIG. 1, FIG. 2, FIG. 3, FIG. 4, FIG. 5, FIG. 6, FIG. 7, and FIG. 8. In some examples, the operations illustrated in FIG. 9, FIG. 10, FIG. 11, FIG. 12, and FIG. 13 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for monitoring items associated with a smart peg display system. For example, the elements illustrated in FIG. 1, FIG. 2, FIG. 3, FIG. 4, FIG. 5, FIG. 6, and FIG. 7, such as when encoded to perform the operations illustrated in FIG. 8 and FIG. 9, constitute exemplary means for activating the set of sensors on occurrence of the per-peg beacon interval, obtains sensor data generated by the set of sensors, exemplary means for analyzing the obtained sensor data to determine a status of the smart peg device, exemplary means for determining whether sending the notification is authorized based on the determined status and a set of criteria, exemplary means for generating a beacon notification; exemplary means for activating a beacon device to output the generated beacon notification to at least one remote computing device; and exemplary means for returning to a stand-by mode until a next occurrence of the per-peg beacon interval.

In other examples, the elements illustrated in FIG. 1, FIG. 2, FIG. 3, FIG. 4, FIG. 5, FIG. 6, and FIG. 7, such as when encoded to perform the operations illustrated in FIG. 8 and FIG. 9, constitute exemplary means for extracting a per-peg beacon interval and a set of beacon criteria from calibration data associated with a smart peg device; exemplary means for obtaining sensor data from a set of sensors associated with a smart peg device for displaying a set of items on expiration of the per-peg beacon interval, the sensor data comprising weight data for a set of items on the smart peg display; exemplary means for analyzing the obtained sensor data, including the weight data, using a predetermined weight of the assigned item; exemplary means for determining a status of the smart peg device using the analysis results and the set of beacon criteria, the status comprising a number of items in the set of items or an identification of at least one unassigned item in the set of items; exemplary means for determining whether to send a beacon notification based on the determined status of the smart peg device; exemplary means for transmitting the beacon notification to at least one remote computing device; and exemplary means for switching the smart peg device into a stand-by mode.

In still other examples, the elements illustrated in FIG. 1, FIG. 2, FIG. 3, FIG. 4, FIG. 5, FIG. 6, and FIG. 7, such as when encoded to perform the operations illustrated in FIG. 8 and FIG. 9, constitute exemplary means for switching a smart peg controller from a stand-by mode to an active mode on occurrence of a per-peg beacon interval to obtain sensor data from the one or more sensors communicatively coupled to the smart peg display, the sensor data used to detect removal or addition of an item relative to the smart peg display, the smart peg display comprising at least one smart peg device; exemplary means for analyzing the sensor data to detect, by the smart peg controller, at least one beacon criteria indicating a change in status of at least one item associated with the smart peg display; exemplary means for determining whether transmission of the notification is authorized based on the analyzed sensor data and the at least one beacon criteria; exemplary means for generating a notification in response to determining sending the notification is authorized; exemplary means for transmitting the notification to at least one remote computing device via a network, the notification comprising a peg identifier (ID) of a smart peg device and a recommended corrective action associated with the smart peg device; and exemplary means for switching the smart peg controller from the active mode to the stand-by mode.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for autonomously monitoring items associated with a peg display, the system comprising:
   a smart peg device implemented on the peg display, at least one item assigned to the smart peg device;
   a set of sensors configured to detect at least one item associated with the smart peg device; and
   a smart peg controller, implemented on at least one processor, communicatively coupled to the set of sensors, that; activates the set of sensors on occurrence of a per-peg beacon interval, obtains sensor data generated by the set of sensors, analyzes the obtained sensor data to determine a status of the smart peg device, determines whether sending a notification is authorized based on the determined status and a set of criteria, responsive to a determination that sending the notification is authorized, generates a notification, activates a beacon device to output the generated notification to at least one remote computing device, and returns to a stand-by mode until a next occurrence of the per-peg beacon interval.

2. The system of claim 1, further comprising:
   a configuration controller, wherein the configuration controller receives calibration data from a remote computing device and extracts a per-peg beacon interval from the received calibration data, wherein the beacon device is configured to transmit the generated notification to the at least one remote computing device on occurrence of the per-peg beacon interval.

3. The system of claim 1, further comprising:
   a configuration controller, wherein the configuration controller receives calibration data from a remote computing device and extracts a predetermined weight of the assigned item from the calibration data, and wherein the set of sensors further comprises:
   at least one weight sensor capturing weight data for a set of items associated with the smart peg device, the smart peg controller identifying the status of the smart peg device based on the captured weight data and the predetermined weight of the assigned item, wherein the weight data indicates a total weight of the set of items divided by the predetermined weight of the assigned item to calculate a total number of items in the set of items or identify unassigned items in the set of items.

4. The system of claim 1, wherein the set of sensors further comprises:
at least one proximity sensor capturing light data associated with the smart peg device, the smart peg controller detecting at least one of removal of the at least one item associated with the smart peg device or addition of at least one other item to the smart peg device based on the captured light data.

5. The system of claim 1, wherein the smart peg controller is further executed on at least one processor to obtain item data associated with the at least one item assigned to the smart peg device from an item data repository and calculates a per-peg beacon interval based on the item data.

6. The system of claim 1, further comprising:
a light coupled to the smart peg device, wherein the smart peg controller activates the light to request corrective action associated with the smart peg device, wherein the corrective action comprises at least one of restocking the at least one item associated with the smart peg device, re-orienting the at least one item associated with the smart peg device, or removing the at least one item from the smart peg device.

7. The system of claim 1, further comprising:
a set of context-data sources; and
a calibration component, wherein the calibration component obtains context-data from the set of context-data sources and generates an updated per-peg beacon interval based on the obtained context-data.

8. The system of claim 1, further comprising:
a plurality of smart peg devices associated with a retail location, the plurality of smart peg devices generating the sensor data associated with a plurality of items associated with the retail location; and
a network configured to transmit the sensor data to a remote server, an inventory management component of the remote server analyzing the sensor data to determine a current inventory of items associated with the retail location.

9. The system of claim 1, further comprising:
a memory associated with the smart peg device, the smart peg controller storing the sensor data on the memory.

10. The system of claim 1, further comprising:
a remote data storage device, the smart peg controller transmitting the sensor data to the remote data storage device for storage via a network.

11. A method for autonomously monitoring items associated with a peg display, the method comprising:
receiving calibration data by a calibration controller associated with a smart peg device for displaying a set of items;
identifying a per-peg beacon interval and a set of beacon criteria from the calibration data;
responsive to an expiration of the per-peg beacon interval, obtaining sensor data from a set of sensors associated with the smart peg device, the obtained sensor data comprising weight data for the set of items on the smart peg device;
analyzing the obtained sensor data, including the weight data, using a predetermined weight of an assigned item associated with the smart peg device, the predetermined weight obtained from the calibration data;
determining a status of the smart peg device using analysis results and the set of beacon criteria, the determined status comprising a number of items in the set of items or an indication of a misplaced item;
determining whether a beacon notification is authorized based on the determined status of the smart peg device and the set of beacon criteria;
responsive to determining the beacon notification is authorized, transmitting the beacon notification to at least one remote computing device; and
responsive to determining the beacon notification is unauthorized, switching the smart peg device into a stand-by mode.

12. The method of claim 11, further comprising:
obtaining item data associated with the at least one item assigned to the smart peg device from an item data repository, by a calibration controller on a remote computing device;
calculating the per-peg beacon interval based on the item data; and
generating the calibration data using the obtained item data and the calculated per-peg beacon interval.

13. The method of claim 11, wherein the beacon notification comprises a peg identifier (ID), an item ID, and a recommended corrective action.

14. The method of claim 11, wherein the remote computing device receives sensor data from a plurality of smart peg devices, analyzes the received sensor data to determine one or more individual statuses of individual smart peg devices in the plurality of smart peg devices, and calculates an inventory of items associated with the plurality of smart peg devices based on the one or more individual statuses of each smart peg device, the one or more individual statuses indicates at least one of a number of items associated with an individual smart peg device or a location of at least one item associated with the individual smart peg device.

15. The method of claim 11, further comprising:
automatically switching to a stand-by mode in response to transmitting the generated beacon notification until an occurrence of a next per-peg beacon interval.

16. One or more computer storage devices having computer-executable instructions stored thereon for autonomously monitoring items associated with a smart peg display, which, on execution by a computer, cause the computer to perform operations comprising:
responsive to an occurrence of a per-peg beacon interval, switching a smart peg controller from a stand-by mode to an active mode to obtain sensor data from one or more sensors communicatively coupled to the smart peg display, the obtained sensor data used to detect removal or addition of an item relative to the smart peg display, the smart peg display comprising at least one smart peg device;
analyzing the obtained sensor data to detect, by the smart peg controller, at least one beacon criteria indicating a change in status of at least one item associated with the smart peg display;
determining whether transmission of a notification is authorized based on the analyzed sensor data and the at least one beacon criteria;
generating the notification in response to determining sending the notification is authorized;
transmitting the notification to at least one remote computing device via a network, the notification comprising a peg identifier (ID) of a smart peg device and a recommended corrective action associated with the smart peg device; and
switching the smart peg controller from the active mode to the stand-by mode.

17. The one or more computer storage devices of claim 16, wherein the recommended corrective action comprises at least one of restocking the at least one item associated with the smart peg display, re-orienting the at least one item associated with the smart peg display, or removing the at least one item associated with the smart peg display.

18. The one or more computer storage devices of claim 16, wherein the at least one beacon criteria further comprises at least one of a maximum weight criteria, a minimum weight criteria, a maximum number of items, or a minimum number of items.

19. The one or more computer storage devices of claim 16 having further computer-executable instructions comprising:
- generating the notification in accordance with a set of notification parameters; and
- outputting the generated notification to a mobile computing device via a beacon device associated with the smart peg controller.

20. The one or more computer storage devices of claim 16 having further computer-executable instructions comprising:
- obtaining context-data associated with at least one item assigned to the smart peg device from a set of context-data sources; and
- generating updated calibration data based on the context-data and item data associated with the at least one item.

* * * * *